US012038092B2

(12) United States Patent
Tasserit et al.

(10) Patent No.: US 12,038,092 B2
(45) Date of Patent: Jul. 16, 2024

(54) FAUCET WITH MULTI-DIRECTIONAL CONTROLS

(71) Applicant: Kohler Co., Kohler, WI (US)

(72) Inventors: Anaël Tasserit, Trigny (FR); Gaëtan Wangon, Merfy (FR); Jean Hugues Soulier, Paris (FR); Olivier Chalancon, Reims (FR)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 17/180,279

(22) Filed: Feb. 19, 2021

(65) Prior Publication Data

US 2021/0172538 A1 Jun. 10, 2021

Related U.S. Application Data

(63) Continuation of application No. 16/214,299, filed on Dec. 10, 2018, now Pat. No. 10,927,967, which is a
(Continued)

(51) Int. Cl.
*F16K 31/60* (2006.01)
*E03C 1/04* (2006.01)
(Continued)

(52) U.S. Cl.
CPC ............ *F16K 11/18* (2013.01); *E03C 1/0412* (2013.01); *F16K 31/605* (2013.01);
(Continued)

(58) Field of Classification Search
CPC ...... F16K 31/605; F16K 31/445; F16K 31/60; F16K 11/044; E03C 1/0412;
(Continued)

(56) References Cited

U.S. PATENT DOCUMENTS 1,573,210 A 2/1926 Whidden
1,641,561 A 9/1927 Whidden
(Continued)

FOREIGN PATENT DOCUMENTS

CN 200955609 10/2007
CN 104747781 7/2015
(Continued)

OTHER PUBLICATIONS

Extended European Search Report mailed Jun. 26, 2018 for International Application No. 17206319.0.
(Continued)

*Primary Examiner* — Matthew W Jellett
*Assistant Examiner* — Christopher D Ballman
(74) *Attorney, Agent, or Firm* — Husch Blackwell LLP

(57) ABSTRACT

A faucet that includes a housing, a first valve, a handle body, a handle, and a second valve. The first valve is disposed at least in part within the housing and controls one of a flow rate and a temperature. The handle body has an elongated base, which extends from the housing along a longitudinal axis and is operatively coupled to the first valve, such that rotation of handle body about the longitudinal axis relative to the housing controls the first valve. The handle extends from the base along a radial axis relative to the longitudinal axis. The second valve is disposed at least in part within the handle and controls the other of the flow rate and the temperature, the second valve operatively couples the handle to the base, such that rotation of the handle about the radial axis relative to the handle body controls the second valve.

18 Claims, 14 Drawing Sheets

Related U.S. Application Data continuation of application No. 15/403,789, filed on Jan. 11, 2017, now Pat. No. 10,184,575.

(51) Int. Cl.
*F16K 11/18* (2006.01)
*F16K 11/044* (2006.01)
*F16K 31/44* (2006.01)

(52) U.S. Cl.
CPC .......... *E03C 1/0401* (2013.01); *E03C 1/0404* (2013.01); *F16K 11/044* (2013.01); *F16K 31/445* (2013.01); *F16K 31/60* (2013.01); *Y10T 137/87692* (2015.04); *Y10T 137/87708* (2015.04)

(58) Field of Classification Search
CPC ................. E03C 1/0401; E03C 1/0404; Y10T 137/87708; Y10T 137/87692
See application file for complete search history.

(56) References Cited

U.S. PATENT DOCUMENTS

| | | | |
|---|---|---|---|
| 3,472,283 A | 10/1969 | Christiansen | |
| 3,584,784 A * | 6/1971 | Burhop | G05D 23/1353 137/625.34 |
| 3,805,842 A | 4/1974 | Thompson et al. | |
| 3,929,283 A * | 12/1975 | Delpla | G05D 23/1353 236/12.2 |
| 3,952,764 A | 4/1976 | Keller, III | |
| 4,084,611 A * | 4/1978 | Mahrer | F16K 11/18 137/454.2 |
| 4,183,377 A * | 1/1980 | Bernat | F16K 11/0785 137/636.4 |
| 4,682,626 A * | 7/1987 | Bergmann | G05D 23/1393 137/551 |
| 4,966,191 A | 10/1990 | Azizi | |
| 4,981,156 A | 1/1991 | Nicklas et al. | |
| 5,660,203 A | 8/1997 | Gnauert et al. | |
| 5,810,050 A | 9/1998 | Pickerrell et al. | |
| 6,058,972 A | 5/2000 | Kahle et al. | |
| 6,199,586 B1 | 3/2001 | Pawelzik et al. | |
| 6,371,163 B1 | 4/2002 | Kahle et al. | |
| 6,585,467 B2 * | 7/2003 | Junkers | F16B 31/04 411/533 |
| 6,641,061 B1 | 11/2003 | Hsieh | |
| 7,171,984 B2 | 2/2007 | Pawelzik et al. | |
| 7,296,588 B1 | 11/2007 | Hwang | |
| 7,389,793 B2 | 6/2008 | Wang | |
| 7,533,683 B2 | 5/2009 | Ortega et al. | |
| 7,607,449 B2 | 10/2009 | Herring et al. | |
| 7,802,733 B2 * | 9/2010 | Schmitt | G05D 23/1393 137/597 |
| 7,871,020 B2 | 1/2011 | Nelson et al. | |
| 8,474,481 B2 | 7/2013 | Huang | |
| 8,567,430 B2 | 10/2013 | Allen et al. | |
| 8,739,813 B2 | 6/2014 | Moore et al. | |
| 8,746,283 B2 | 6/2014 | Koury et al. | |
| 8,820,705 B2 | 9/2014 | Davidson et al. | |
| 8,944,093 B2 | 2/2015 | Veros et al. | |
| 9,567,734 B2 * | 2/2017 | Davidson | F16K 31/02 |
| 9,630,856 B2 | 4/2017 | Loniewski et al. | |
| 9,920,508 B2 | 3/2018 | Chen | |
| 2005/0076960 A1 | 4/2005 | Luig et al. | |
| 2011/0089355 A1 | 4/2011 | Leutwyler | |

FOREIGN PATENT DOCUMENTS

| | | |
|---|---|---|
| DE | 20308906 | 9/2003 |
| EP | 2 884 012 | 6/2015 |
| GB | 2 429 760 | 3/2007 |
| WO | WO-2008/136959 | 11/2008 |
| WO | WO-2013/160353 | 10/2013 |

OTHER PUBLICATIONS

First CN Office Action mailed Feb. 22, 2019 for International Application No. 201711241069.3.

Notice of Allowance for U.S. Appl. No. 16/214,299 dtd Oct. 28, 2020.

* cited by examiner

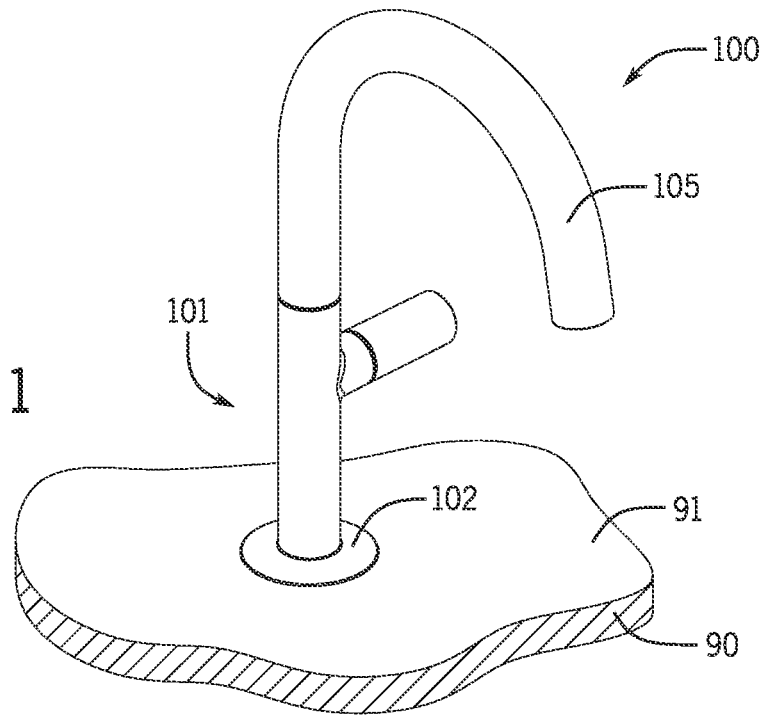
FIG. 1
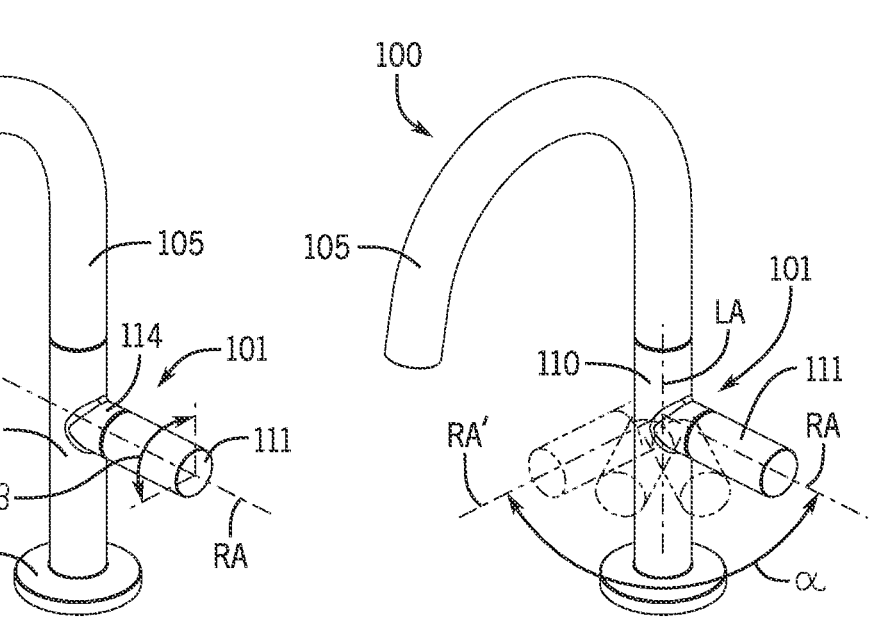
FIG. 2
FIG. 3

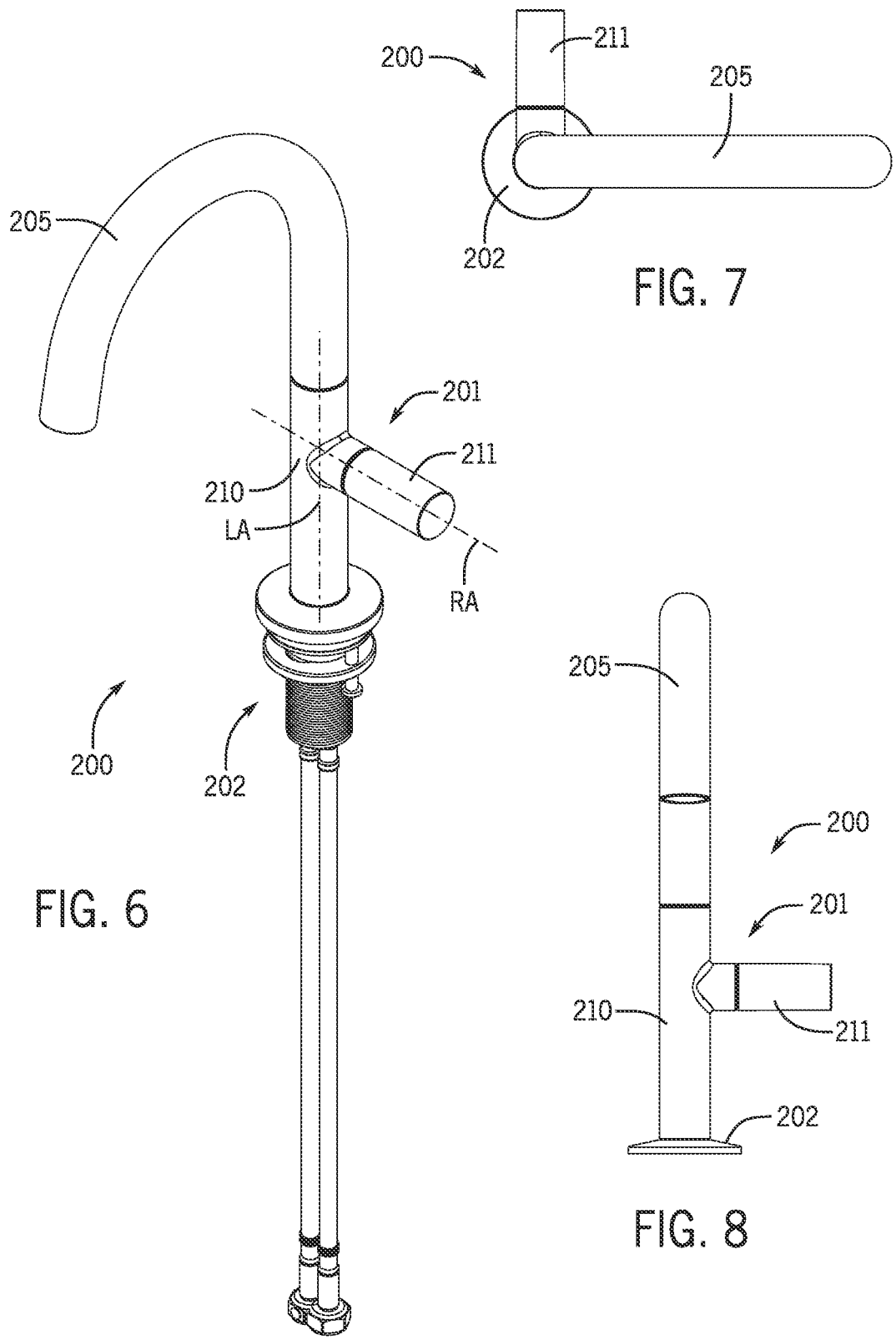

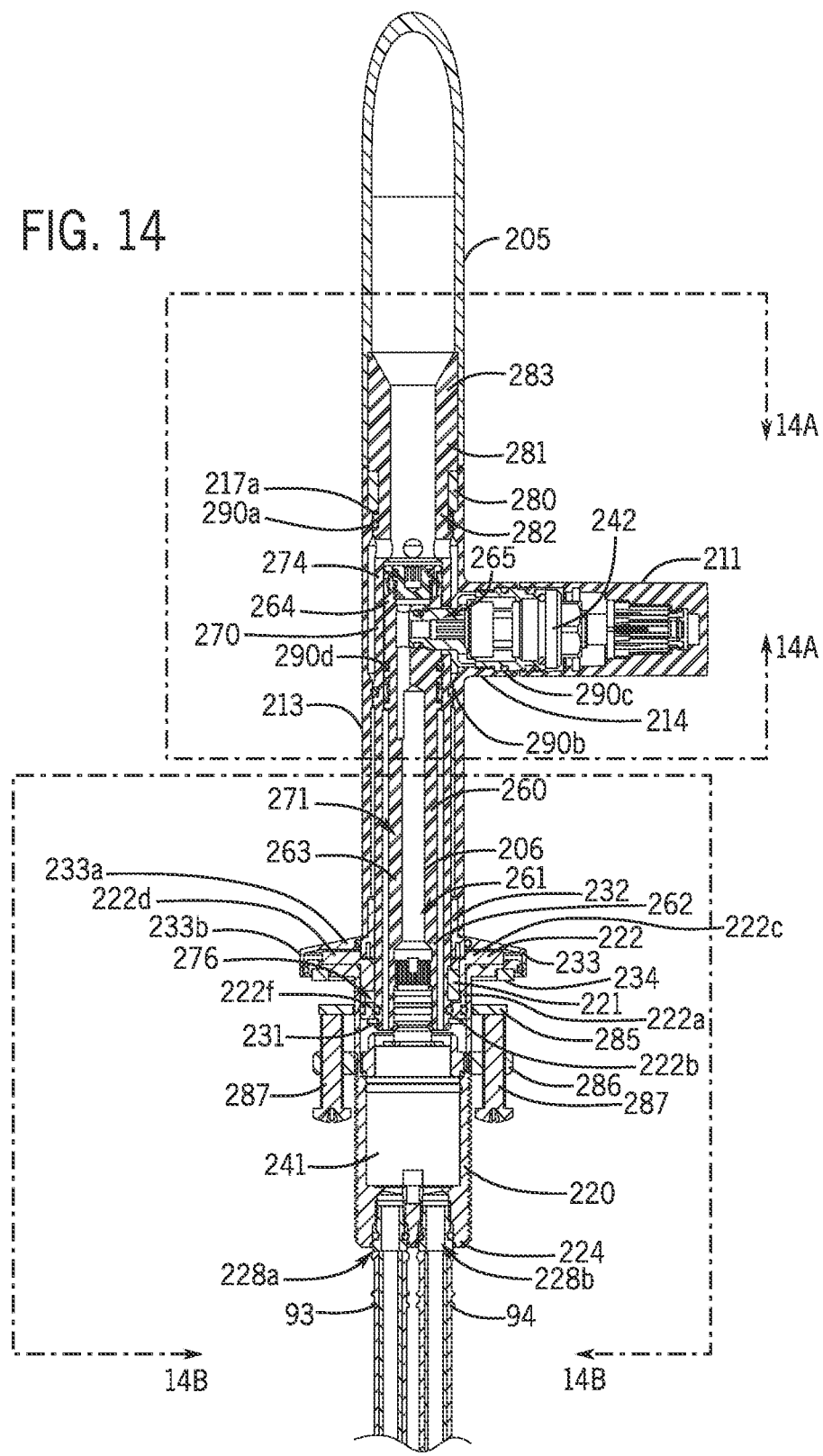

FAUCET WITH MULTI-DIRECTIONAL CONTROLS

CROSS-REFERENCE TO RELATED APPLICATIONS

This application is a Continuation of U.S. patent application Ser. No. 16/214,299, filed Dec. 10, 2018, which is a Continuation of U.S. patent application Ser. No. 15/403,789, filed Jan. 11, 2017, both of which are incorporated by reference herein in their entireties.

BACKGROUND

This application relates generally to the field of faucets. More specifically, this application relates to faucets having a handle that provides for multi-directional control of water temperature and flow rate about two separate axes.

SUMMARY

One embodiment relates to a faucet that is mountable to a mounting surface. The faucet includes a base, a sleeve, a handle body, a first valve, a second valve, and a spout. The base is configured to detachably mount to the mounting surface. The sleeve is coupled to the base, such that the sleeve extends upwardly from the base. The handle body is disposed around the sleeve and is configured to rotate about a vertical axis (e.g., relative to the base). The handle body includes a vertical portion and a horizontal portion extending outward from a side of the vertical portion. The first valve is disposed within the base, and the second valve is disposed within the horizontal portion of the handle body. The spout is configured to receive water from the sleeve and direct the water to an outlet of the spout. The vertical portion of the handle body is configured to be rotated about the vertical axis to control the first valve, and the horizontal portion of the handle body is configured to be rotated about a horizontal axis to control the second valve.

Another embodiment relates to a faucet that is mountable to a mounting surface and configured to fluidly connect to a supply of hot water and a supply of cold water. The faucet includes a base configured to detachably mount to the mounting surface; a first valve supported by the base and configured to control a temperature of water comprising the hot water, the cold water or a mixture thereof through the first valve; a spout configured to receive and output a flow of water; and a handle assembly. The handle assembly includes a handle body disposed between and rotatable relative to the base and the spout about a longitudinal axis; a handle extending outwardly from the handle body along a radial axis relative to the longitudinal axis; and a second valve disposed within the handle assembly and configured to control a flow rate of the flow of water to the spout. The handle is rotatable relative to the handle body about the radial axis to control the second valve, and the handle rotates with the handle body about the longitudinal axis to control the first valve.

Yet another embodiment relates to a faucet that is configured to fluidly connect to a supply of hot water and a supply of cold water. The faucet includes a spout having an outlet configured to output a flow of water; a first valve configured to control a temperature of water comprising the hot water, the cold water, or a mixture thereof through a first adjustment; a second valve configured to control a flow rate of the water from the first valve to the spout through a second adjustment; a handle body that is rotatable about a longitudinal axis; a handle extending outwardly from the handle body along a radial axis relative to the longitudinal axis, where the handle is rotatable relative to the handle body about the radial axis to control the second adjustment; a support sleeve that is disposed in the handle body and supports the spout; and a rotatable sleeve that is disposed in the support sleeve and fluidly connects the first and second valves, wherein rotation of the handle body rotates the rotatable sleeve and the handle about the longitudinal axis to control the first adjustment.

BRIEF DESCRIPTION OF THE DRAWINGS

FIG. 1 is a perspective view of an exemplary embodiment of a faucet, according to the present application.

FIG. 2 is another perspective view of the faucet shown in FIG. 1 indicating a motion to control the flow of water through the faucet.

FIG. 3 is another perspective view of the faucet shown in FIG. 1 indicating a motion to control the temperature of water flowing through the faucet.

FIG. 6 is a perspective view of another exemplary embodiment of a faucet, according to the present application.

FIG. 7 is a top view of the faucet shown in FIG. 6.

FIG. 8 is a front view of the faucet shown in FIG. 6.

FIG. 14 is another cross-sectional view of the faucet shown in FIG. 6 taken along line 14-14 in FIG. 7.

DETAILED DESCRIPTION

Figure 4:
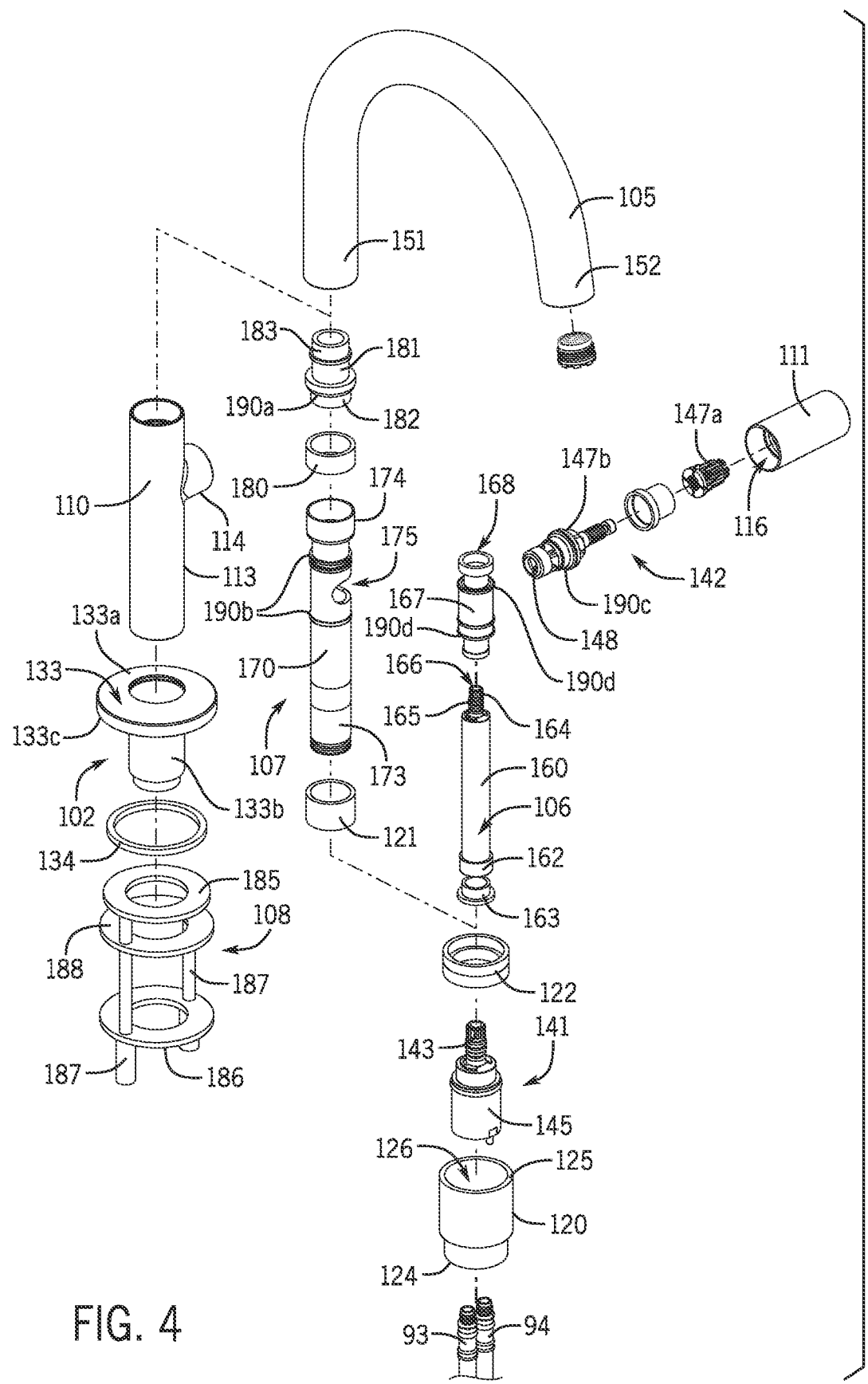
FIG. 4 is an exploded view of the faucet shown in FIG. 1.

Referring generally to the Figures, disclosed herein are various embodiments of faucets that provides for multi-directional control of water temperature and flow rate about two separate axes. The faucets include handle assemblies that have a first member, which is rotatable about a first axis to control the temperature of water flowing through and from the faucet, and a second member, which is rotatable about a second axis to control the flow rate of water flowing through and from the faucet. The first and second axes may be transversely arranged, such as, for example, perpendicular to one another.

FIGS. 1-5 illustrate an exemplary embodiment of a faucet 100 having a handle assembly 101, a base 102, a spout 105, and a valve assembly 104. As shown in FIG. 1, the base 102 is configured to mount to a support 90 to secure the faucet 100 to the support 90. The support 90 may be, according to non-limiting examples, a sink, a countertop, a cabinet or other suitable member. The support 90 includes a mounting surface 91, which is shown in FIG. 1 as an upper surface of the support 90, on which the faucet 100 (e.g., the base 102) is mounted.

The handle assembly 101 is configured to provide a multi-directional control of temperature and flow rate of water to an outlet of the faucet. The handle assembly 101 (or a portion thereof) may be moveable (e.g., rotatable) about a first axis to control a temperature of water, and the handle assembly 101 (or a portion thereof) may be moveable about a second axis to control a flow rate of water, where the second axis is not the same as (e.g., is not collinear with) the first axis. As shown in FIGS. 1-5, the handle assembly includes a handle body 110 and a handle 111. The handle 111 is rotatable relative to the handle body 110 to control the flow rate of water; and the handle 111 rotates with the handle body 110 to control the temperature of the water.

Also shown in FIG. 3, the first axis is configured as a longitudinal axis LA of the handle body 110, such that the handle assembly 101 (e.g., the handle body 110 and the handle 111) is rotatable about the longitudinal axis LA to control the temperature of water flowing through the faucet 100 (e.g., the spout 105). The longitudinal axis LA may extend vertically through a center of the handle body 110. The longitudinal axis LA may be concentric with base 102 (e.g., center axis thereof). The longitudinal axis LA may be configured as a vertical axis. The handle assembly 101 is rotatable about the longitudinal axis LA by an angular rotation a between a first position and a second position. According to one embodiment, the first position corresponds to a maximum cold temperature of the water flow and the second position corresponds to a maximum hot temperature of the water flow. For example, in the first position, the cold water supply may be fully open and the hot water supply may be fully closed; and in the second position, the cold water supply may be fully closed and the hot water supply may be fully open. The handle assembly 101 can be positioned in any number of intermediate positions located between the first and second positions, where each intermediate position corresponds to a different temperature setting. For example, as the handle assembly 101 is rotated from the first position toward the second position, the temperature progressively increases from the maximum cold temperature toward the maximum hot temperature. According to one non-limiting example, the angular rotation a between the first position and the second position is about 90° (e.g., ninety degrees plus/minus ten degrees). A 90° rotation advantageously provides a range of motion that is large enough to accurately set the temperature while moving the handle, but not so large as to end up with a user's arm/hand under the flow during adjustment of the handle.

The handle body 110 includes a base 113 and a shoulder 114. As shown best in FIGS. 4 and 5, the base 113 is a hollow member having a substantially cylindrical shape to receive other elements/components of the faucet 100. The base 113 defines the longitudinal axis LA about which the handle body 110 rotates. Also shown, an outer profile of the base 113 of the handle body 110 is substantially the same as an outer profile of the spout 105. This arrangement improves the aesthetics of the faucet 100 by providing a harmonious outer profile between the base 113 and the spout 105 with a more seamless appearance.

The shoulder 114 of the handle body 110 extends outwardly form the base 113 and is configured to support the handle 111 either directly or indirectly, such as through the second valve 142. As shown in FIG. 14, the shoulder 114 is hollow member having a substantially cylindrical shape to receive other elements/components of the faucet 100, such as the second valve 142. Also, an outer profile of the shoulder 114 may be substantially the same as an outer profile of the handle 111. This arrangement improves the aesthetics of the faucet 100 by providing a harmonious outer profile between the shoulder 114 and the handle 111 with a more seamless appearance.

As shown in FIG. 2, the second axis is configured as a radial axis RA of the handle 111, such that the handle 111 is rotatable relative to the handle body 110 about the radial axis RA to control a flow of water through the faucet 100 (e.g., the spout 105). The radial axis RA may extend horizontally through a center of the handle 111. For example, the handle 111 may be a substantially cylindrical member that extends outwardly from the handle body 110 and along the radial axis RA. The radial axis RA may be configured as a horizontal axis, such that handle 111 extends horizontally from the handle body 110. The handle 111 may be open at an inner end having a chamber 116 (e.g., cavity) that receives the second valve 142 (e.g., at least a portion thereof). An outer end of the handle 111 may be closed. As noted, the outer profile of the handle 111 may complement (e.g., be the same as or substantially the same as) the outer profile of the shoulder 114 of the handle body 110.

Figure 9:
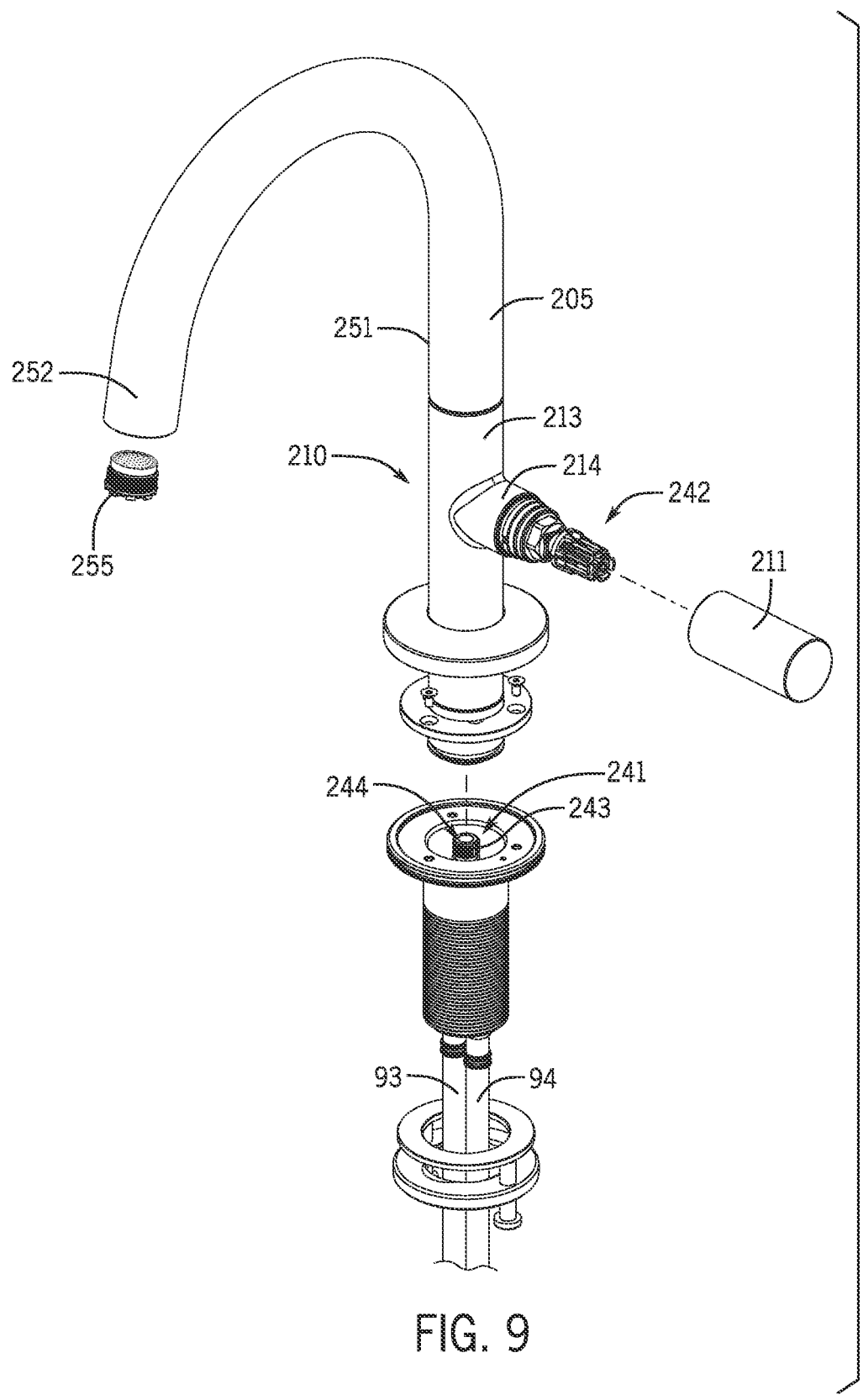
FIG. 9 is a partially exploded perspective view of the faucet shown in FIG. 6.
Figure 15:
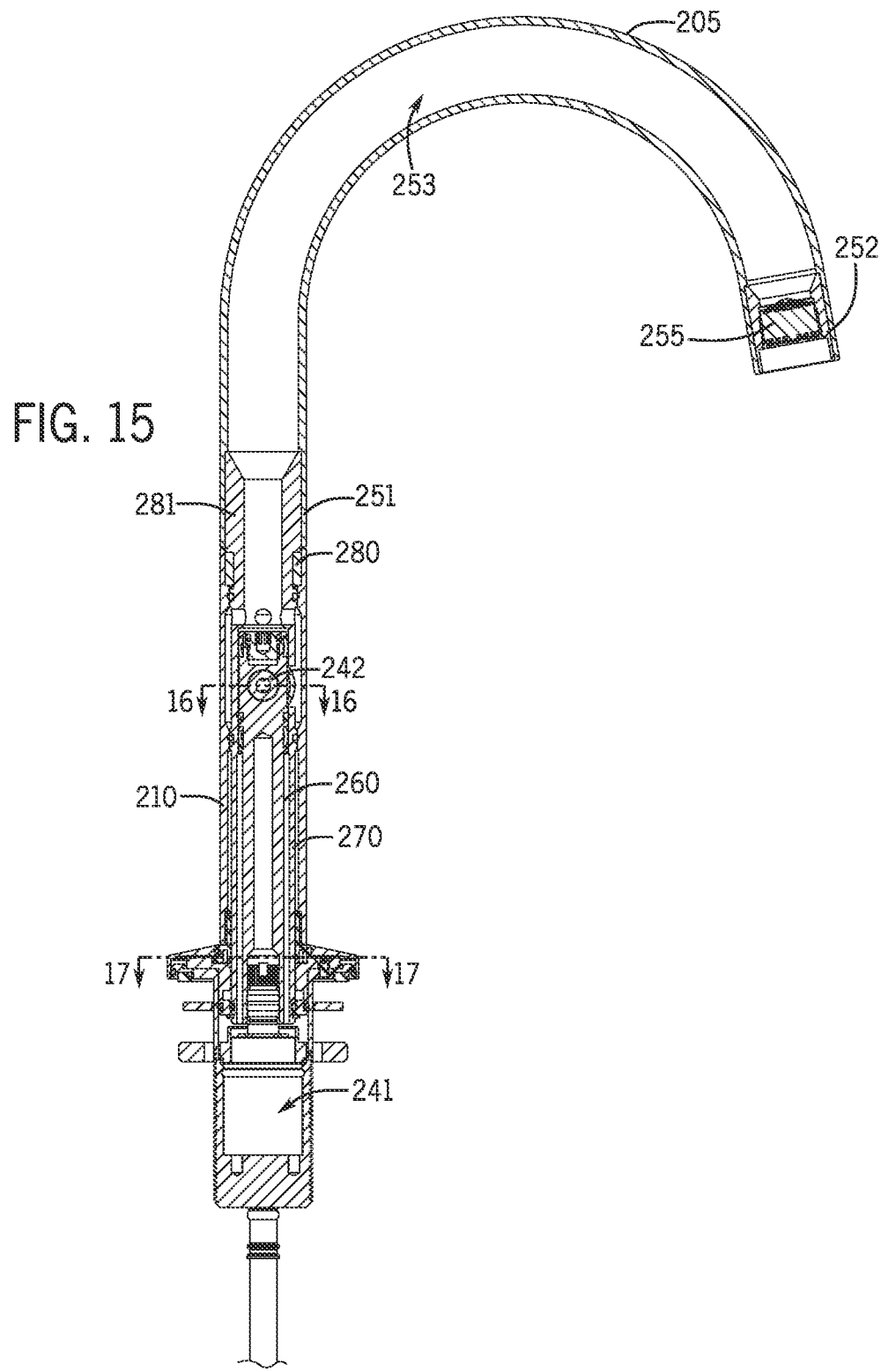
FIG. 15 is another cross-sectional view of the faucet shown in FIG. 6 taken along line 15-15 in FIG. 7.

The spout 105 is a hollow member having a first end 151 (e.g., inlet end, entrance, etc.) fluidly connected to a second end 152 (e.g., outlet end, outlet, etc.) through a fluid passage 153. As shown in FIGS. 9 and 15, the spout 105 is a generally U-shaped or J-shaped tubular element. The second end 152 may be configured to receive an element, such as an aerator 155, sprayer or other device to influence the configuration (e.g., shape, pattern) of the water emitted from the second end 152 of the spout 105. The first end 151 is configured to be coupled to another element of the faucet 100, which is discussed below.

Figure 5:
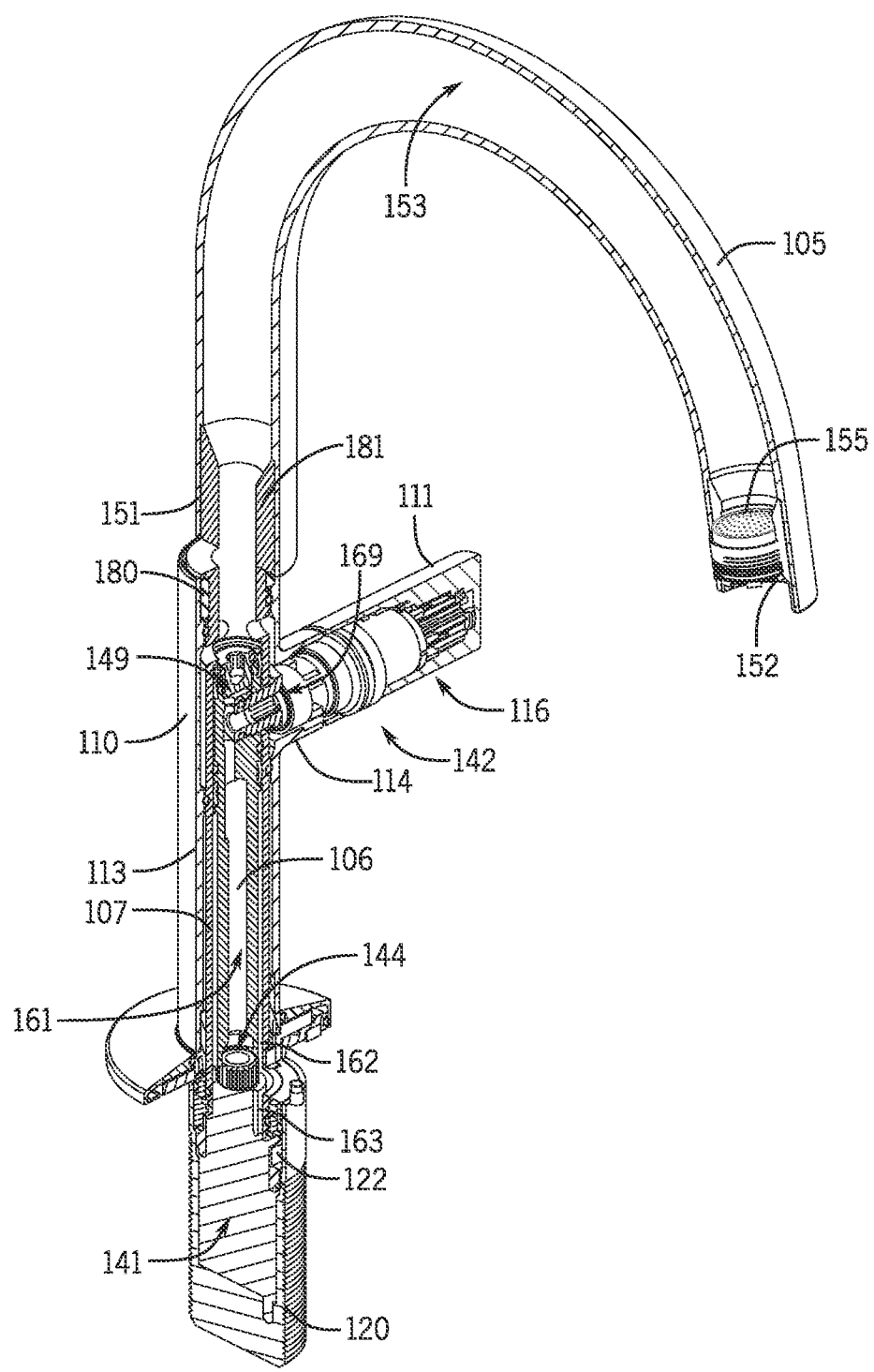
FIG. 5 is a cross-sectional view of the faucet shown in FIG. 1.

The valve assembly 104 includes a valve. As shown in FIGS. 4 and 5, the valve assembly 104 includes a first valve 141 and a second valve 142. The first valve 141 is configured to fluidly connect to hot and cold water supplies through the first and second fluid conduits 93, 94 (see FIG. 4) and to control the outputted temperature of water based on the hot and cold water received through the conduits 93, 94. The first valve 141 is received in an element/component (e.g., housing) of the base 102, which is discussed below. The first valve 141 can be adjusted, such as through a torque connection (e.g., an adjustment gear 143) to vary the temperature of water outputted from the first valve 141 through an output 144. Rotation of the adjustment gear 143 in a first direction (e.g., clockwise, counterclockwise) increases the temperature of the outputted water, whereas rotation of the adjustment gear 143 in a second direction that is opposite to the first direction decreases the temperature of the outputted water. The adjustment gear 143 may be rotatable relative to a casing 145 of the first valve 141, and the casing 145 may be retained by the base 102 to prevent relative rotation of the casing 145 and the base 102 (or at least part thereof).

The second valve 142 is fluidly connected to the outputted water from the first valve 141 and controls the flow rate of the outputted water to the spout 105. The second valve 142 has a full open position corresponding to a maximum flow rate of water to the spout 105. The second valve 142 has a full closed position corresponding to a zero flow rate (i.e., no water flows to the spout 105). The second valve 142 may include any number of intermediate positions between the full open and full closed positions corresponding to various flow rates between the maximum and zero flow rates. The full open, full closed and any intermediate positions of the second valve 142 are archived by rotation of the handle 111 relative to the handle body 110. The handle 111 retains a first portion 147*a* of the second valve 142 such that rotation of the handle 111 drives rotation of the first portion 147*a* of the second valve 142 relative to a second portion 147*b* of the second valve 142. For example, the first portion 147*a* may be a drive gear or other torque driving device and the second portion 147*b* may be as a casing (or portion thereof). The first portion 147*a* is disposed in the chamber 116 and coupled to the handle 111. Rotation of the first portion 147*a* relative to the second portion 147*b* drives a valve member 148 between full open, full closed, and any intermediate positions relative to a valve chamber 149 (see FIG. 5 as well as FIG. 16 of that embodiment). For example, the valve member 148 may be moved to close off the valve chamber 149 in the full closed position to prevent water from flowing to the spout 105, whereas the valve member 148 may be moved to maximize the flow rate to the spout 105 in the full open position.

The faucet 100 may include one or more than one sleeve. As shown best in FIG. 4, the faucet 100 includes a first (e.g., rotatable) sleeve 106 that is configured to control the first valve 141 upon rotation. The sleeve 106 is configured to rotate with the handle body 110 about the longitudinal axis LA to control the first valve 141. The sleeve 106 includes a hollow tubular member 160 defining an internal fluid passage 161 that fluidly connects the first valve 141 and the second valve 142. The sleeve 106 may include a first torque connection 162 to rotate a mating torque connection of the first valve 141 (e.g., the adjustment gear 143) upon rotation of the sleeve 106 to adjust a temperature of the water from the first valve 141 to the second valve 142. As shown, the first torque connection 162 is disposed at a first end 163 (e.g., bottom end, lower end, etc.) of the sleeve 106. The first torque connection 162 may include a gear, a spline, a key-way feature (i.e., a feature having a shape that is configured to transmit torque) such as a star shape, square shape, "D" shape, "double D" shape or other suitable shape, or any other suitable torque transmission feature. As shown best in FIGS. 4 and 5, a second torque connection 164 is disposed at a second end 165 of the sleeve 106. The second torque connection 164 can be configured the same as or different form the first torque connection 162, and the second torque connection 164 is configured to communicate rotation from a valve connector 167.

The valve connector 167 is configured to transmit rotation of the handle body 110 to the sleeve 106 to thereby control the first valve 141. The valve connector 167 includes an inlet that is fluidly connected with the outlet 166 of the sleeve 106. The valve connector 167 includes a torque connector that is configured to mate with the second torque connector 164 so that rotation of the valve connector 167 drives rotation of the sleeve 106. The valve connector 167 includes an outlet 168 that is fluidly connected with the spout 105 so that water controlled by the second valve 142 passes through the outlet 168 to the spout 105. The valve connector 167 includes an inlet opening 169 that is configured to receive a portion of the second valve 142 to control the flow rate of the water to the spout 105 upon rotation of the handle 111 and the first portion 147*a* of the second valve 142 about the radial axis RA relative to the sleeve 106 and valve connector 167. As shown in FIG. 5, the inlet opening 169 extends transversely through the valve connector 167 at a location that is between the outlet 168 and the inlet. It is noted that the valve connector 167 and the sleeve 106 can be combined into a single component/element, such as, for example, as shown in FIGS. 6-17.

Also shown best in FIGS. 4 and 5, the faucet 100 includes a second sleeve 107 (e.g., a support sleeve, a fixed sleeve, a stationary sleeve, etc.) that is coupled to the base 102. As shown, the second sleeve 107 is configured to remain stationary with the base 102 upon relative rotation of the (rotatable) sleeve 106 and handle body 110, so that there is no relative rotation or translation of the second sleeve 107 relative to the base 102 (or part thereof). According to other exemplary embodiment(s), the second sleeve 107 is coupled to the base 102, such as to prohibit movement along the longitudinal axis LA while allowing relative rotation of the second sleeve 107 (e.g., relative to the base 102 or part thereof). The second sleeve 107 is configured to support the spout 105, such that the handle body 110 and the spout 105 can rotate relative to one another. The second sleeve 107 includes a hollow tubular member 170 defining an internal passage 171 in which the first sleeve 106 is disposed. The tubular member 170 of the sleeve 107 extends from a first end 173 (e.g., bottom end, lower end, etc.) to a second end 174 (e.g., top end, upper end, etc.). The first end 173 is configured to be coupled to and supported by the base 102, which is discussed below (see FIGS. 14 and 15 for reference); and the second end 174 is configured to support the spout 105. The second sleeve 107 may include an aperture 175 that is located between the first and second ends 173, 174 and is configured to receive the portion of the second valve 142 that is received by the inlet opening 169 of the first sleeve 106. As shown in FIG. 4, the aperture 175 is elongated (e.g., slotted) to allow the second valve 142 to rotate relative to the second sleeve 107 (if stationary) upon relative rotation of the first sleeve 106 and the second valve 142 coupled thereto. Thus, the configuration (e.g., size and shape) of the aperture 175 is configured to allow rotation of the handle body 110, the sleeve 106, and the second valve 142 between the maximum cold temperature and the maximum hot temperature.

The faucet 100 may include a swivel joint that allows for the relative rotation between the spout 105 and the second sleeve 107 and/or the handle body 110. As shown in FIG. 4, the swivel joint includes a swivel connector 181 that includes a lower end 182, which engages an upper end of the (stationary) sleeve 107 and/or an upper end of the handle body 110, and an upper end 183, which engages a lower end (e.g., the first end 151) of the spout 105, such as to allow the spout 105 to rotate relative to the second sleeve 107 and/or the first sleeve 106 to reposition the outlet in the spout 105. The swivel connector 181 may be a generally cylindrical element having a bore (e.g., through the center) to allow fluid (e.g., water from the second valve 142) to pass into the fluid passage 153 of the spout 105. The first end 151 of the spout 105 may include an undercut section (e.g., a section having a thinner wall relative to the adjacent wall) that receives the upper end 183 of the swivel connector 181. The lower end 182 of the swivel connector 181 may be coupled (e.g., fixedly, rotatably) to the second sleeve 107 and/or the handle body 110. For example, the lower end 182 may be coupled to the second end 174 of the second sleeve 107. Also, for example, the lower end 182 may be rotatably received in the handle body 110.

The swivel joint may include a collar 180 disposed between a portion of the handle body 110 and a portion of the swivel connector 181 to allow relative rotation between the swivel connector 181 and the handle body 110. The collar 180 may be a cylindrical bushing to facilitate the relative rotation between the swivel connector 181 and the handle body 110. The lower end 182 of the swivel connector 181 may include a channel (e.g., a recess having a smaller diameter than the adjacent section(s)) that receives the collar 180. The configuration (e.g., depth, length, etc.) of the channel may be tailored to the configuration of the collar 180. A seal in the form an O-ring 190*a* may be disposed between the lower end 182 of the swivel connector 181 and the handle body 110 and/or the spout 105 to prohibit leaking therebetween. The lower end 182, the handle body 110 and/or the spout 105 may include a channel or other feature for receiving the O-ring 190*a*. The base 113 of the handle body 110 may include a first supporting section (e.g., the first supporting section 217*a* shown in FIG. 14) that supports the collar 180 and/or the O-ring 190*a*. The first supporting section may have a smaller inner diameter relative to the adjacent section(s) of the base 113. A top of the first supporting section may support a bottom of the collar 180 (if provided) and a top of the collar 180 may support the swivel connector 181.

The faucet 100 may include additional seals (e.g., O-rings) to help prohibit leaking. As shown best in FIGS. 4 and 5, one or more O-rings 190*b* may be disposed between the sleeve 107 and the base 113 of the handle body 110 just below the bottom of the shoulder 114; an O-ring 190*c* may be disposed between the shoulder 114 of the handle body 110 and the second valve 142; and one or more O-rings 190*d* may be disposed between the first sleeve 106 and the second sleeve 107 and/or the valve connector 167, such as proximate to the second valve 142. The base 113 of the handle body 110 may include a second supporting section (see the second supporting section 217*b* shown in FIG. 14) that has a smaller inner diameter relative to the adjacent section(s) of the base 113, where the second supporting section may support an O-ring 190*b*.

Also shown best in FIGS. 4 and 5, the first sleeve 106 is disposed within the second sleeve 107, which is disposed within the handle body 110. Thus, the second sleeve 107 is located between the first sleeve 106 and the handle body 110. This arrangement advantageously facilitates actuation of the first valve 141 even when supported by or located proximate to the base 102, while supporting the spout 105. For example, the first sleeve 106 is configured to rotate relative to the second sleeve 107, such as when adjusting (e.g., setting) the temperature of water from the faucet.

As shown best in FIGS. 4 and 5, the base 102 includes a housing 120, a collar 121, and a retainer 122. The housing 120 is a generally cylindrical element extending between a bottom end 124 and a top end 125. The top end 125 is open defining a bore 126 that extends toward the bottom end 124. The bore 126 is configured to receive the first valve 141, which is retained by the housing 120 (e.g., a sidewall, the bottom end 124). The bottom end 124 includes one or more apertures (e.g., openings, bores) configured to receive fluid conduits for introducing the hot water and the cold water. For example, the bottom end 124 may include a first aperture that receives a first fluid (e.g., hot water) conduit 93 and a second aperture that receives a second fluid (e.g., cold water) conduit 94 (see FIG. 14 for reference).

The retainer 122 includes a sidewall extending between a bottom end and a top end. The retainer 122 may include an outwardly extending annular flange (e.g., radially extending) from the sidewall, such as at the top end. The flange may include one or more holes that receive fasteners that secure the flange to the housing. The retainer 122 may include an inwardly extending flange, such as located at the bottom end, with an inner diameter that is smaller than the adjacent section(s) of the retainer 122. The lower flange may advantageously help retain the first valve 141 by prohibiting the first valve 141 to be withdrawn from the open end of the housing 120 (e.g., during assembly) and/or may help secure the second sleeve 107 to the base 102. According to other examples, the retainer does not include flanges and the sidewall retains the first valve 141 in place.

A retaining member may be configured to secure the second sleeve 107 to the retainer 122 and/or another element of the facet 100, such as by engaging a groove in the second sleeve 107 and/or in the retainer 122 (e.g., the bottom end) such as to prohibit the sleeve 107 and retaining member from being withdrawn (e.g., moved upward) relative to the retainer 122. The retaining member 131 may be a snap-ring having an annular shaped body with a notch (e.g., break) through the body to allow the member to flex into and out of engagement with the sleeve 107 and/or the retainer 122, may be a C-clip, or may have any suitable configuration.

The collar 121 is may be a cylindrical member to support the second sleeve 107. The collar 121 may be a cylindrical bushing to facilitate relative rotation between the second sleeve 107 and the handle body 110 and/or the base 102 (e.g., the retainer 122). The collar 121 may contact a portion of the outer surface of the second sleeve 107 and/or a portion of the inner surface of the sidewall of the handle body 110 and/or the base 102. The second sleeve 107, the handle body 110, and/or the base 102 may include a channel (e.g., a groove, a recess) having a smaller diameter than the adjacent section(s) that receives the collar 121.

The base 102 may include an escutcheon 133 that covers the base 102 to provide improved aesthetics of the faucet 100 when mounted (e.g., coupled, secured, etc.) to the support 90. The escutcheon 133 may include a top wall 133*a*, a first sidewall 133*b* (e.g., an inside sidewall), and a second sidewall 133*c* (e.g., an outside sidewall) that define a cavity (e.g., below the top wall 133*a* and between the sidewalls) that may house other elements/components of the base 102. For example, a portion of the housing 120 may be housed in the cavity to conceal the housed elements from view when the faucet 100 is installed to the support 90. The first sidewall 133*b* may be configured to engage and/or be coupled to the housing 120. For example, the first sidewall 133*b* may include external threads that thread to mating internal threads of the housing 120 (e.g., at the top end 125). The first valve 141 may be retained in the bore 126 after the escutcheon 133 and the housing 120 are coupled together.

The base 102 may include a grommet 134 that is configured to rest on the mounting surface 91 of the support 90. The grommet 134 may be annular in shape and may be made out of an elastomeric material that is compressible to seal the connection between the support 90 and the grommet 134. During fastening of the base 102 to the support 90, the grommet 134 may be compressed. For example, the grommet 134 may engage a recess in an underside of the to end 125 of the housing 120.

The faucet 100 may include a fastening system 108 to secure the base 102 (e.g., one or more elements/components thereof) in place. For example, the fastening system 108 may secure the housing 120 in place to the support 90. As shown best in FIG. 4, the fastening system 108 includes a clamp plate 185, a lock plate 186 and a fastener 187 to adjustably move the clamp plate 185 relative to the lock plate 186. For example, the fastening system 108 may include a plurality of fasteners 187, such as two fasteners 180 on opposite sides of system.

The clamp plate 185 is an annular plate having a top surface that is configured to contact a bottom surface of the member being clamped (e.g., the support 90). The clamp plate 185 also includes a bottom surface that is configured to be contacted by each fastener 187, such as an end thereof. The clamp plate 185 includes a central opening that is configured to receive the housing 120 to allow the clamp plate 185 to be slid over the housing 120 to contact the support 90.

The lock plate 186 is annular in shape. The lock plate 186 may include internal threads that thread to mating external threads of the housing 120 and/or the escutcheon 133 (e.g., the sidewall 133*b*) to allow the lock plate 186 to be screwed onto the housing 120/escutcheon 133 to secure the lock plate 186 in place relative to the housing 120/escutcheon 133. The threads may be provided on a portion of the housing 120 so that the lock plate 186 can be screwed down all the way (i.e., until reaching the non-threaded portion). In this way the non-threaded portion acts as a travel stop to the lock plate 186. The lock plate 186 includes a threaded opening in the annular portion for each fastener 187.

Each fastener 187 is threaded into one of the threaded openings of the lock plate 186 until contacting the clamp plate 185, then further rotation of the fastener 187 moves the clamp plate 185 away from the lock plate 186 through the movement of the end of the fastener 187. In this way, rotating each fastener 187 can move the clamp plate 185 toward the underside of the support 90 until the clamp plate 185 contacts the support 90, upon which further rotation (e.g., tightening) of the fastener 187 applies a clamping force into the support 90 by the clamp plate 185. The fastening system 108 advantageously allows for the faucet 100 to be secured to different thickness supports 90.

The fastening system 108 may include other elements/components. For example, an intermediate plate 188 (e.g., second lock plate) may be provided. If provided, the intermediate plate 188 includes an annular member having a threaded opening through the annular member for each fastener 187. A fastener 187 can be threaded through the threaded opening in the intermediate plate 188 to contact the clamp plate 185.

FIGS. 6-17 illustrate another exemplary embodiment of a faucet 200 that provides for multi-directional control of water temperature and flow rate about two separate axes. As shown in FIG. 6, the faucet 200 includes a handle assembly 201 that provides a multi-directional control of temperature and flow rate of water to a spout 205 of the faucet 200. The faucet 200 also includes a base 202 (e.g., base assembly) and a valve assembly 204. Like the base 102 shown in FIG. 1, the base 202 is configured to mount to a support 90 to secure the faucet 200 to the support 90.

The handle assembly 201 includes a handle body 210 and a handle 211. The handle 211 is rotatable about a first axis of rotation (e.g., a radial axis RA) relative to the handle body 210 to control the flow rate of water. The handle body 210 is rotatable about a second axis of rotation (e.g., a longitudinal axis LA) relative to the base 202 to control the temperature of water. The handle 211 rotates with the handle body 210 about the second axis of rotation. According to an exemplary embodiment, the first and second axes of rotation are arranged to be not collinear. For example, the first and second axes of rotation may be arranged to be transverse, such as perpendicular or at an oblique angle relative to one another. The first and second axes of rotation may be arranged at a compound angle relative to one another.

Also shown in FIG. 6, the second axis of rotation (i.e., the longitudinal axis LA) of the handle body 210 extends vertically through a center of the handle body 210. The longitudinal axis LA may be concentric with a center axis of the base 202, the spout 205 or another component/element of the faucet 200. The handle 211 and the handle body 210 are rotatable about the longitudinal axis LA by an angular rotation (e.g., the angular rotation a shown in FIG. 3) between a first position, which corresponds to a maximum cold water temperature, and a second position, which corresponds to a maximum hot water temperature. For example, in the first position, the first valve 241 (see FIGS. 11 and 12) may be configured with the cold water supply fully open and the hot water supply fully closed; while in the second position, the first valve 241 may be configured with the cold water supply fully closed and the hot water supply fully open. The handle assembly 201 can be repositioned in any number of intermediate positions located between the first and second positions, where each intermediate position corresponds to a different temperature setting (e.g., of the first valve 241). For example, as the handle assembly 101 is rotated from the first position toward the second position, the temperature progressively increases from the maximum cold temperature toward the maximum hot temperature.

Figure 10:
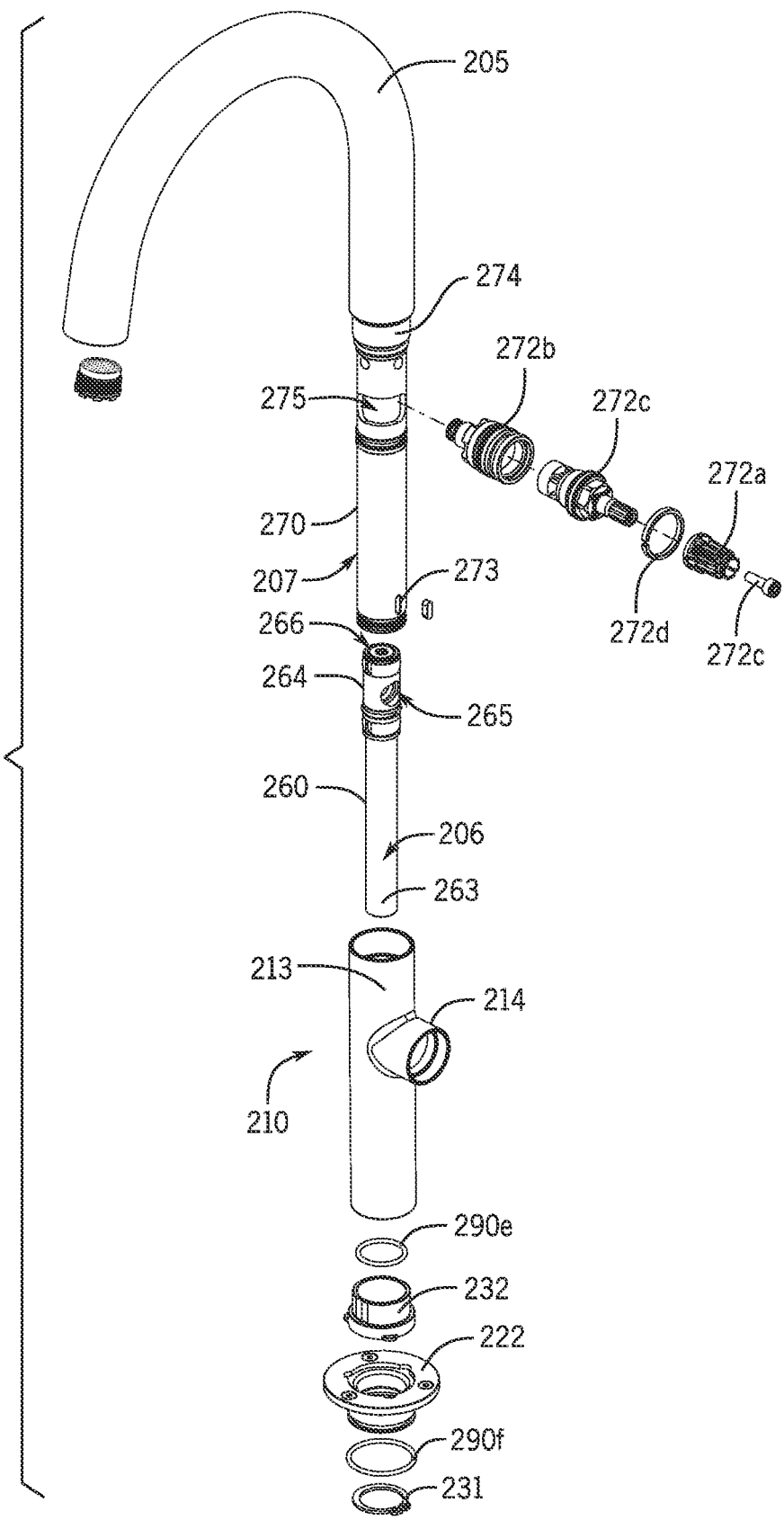
FIG. 10 is another partially exploded perspective view of the faucet shown in FIG. 6.

As shown best in FIG. 10, the handle body 210 includes a base 213 and a shoulder 214. The base 213 is a hollow member having a substantially cylindrical shape to receive other elements/components of the faucet 200. The base 213 defines the longitudinal axis LA about which the handle body 210 rotates. As shown in FIG. 9, an outer profile of the base 213 of the handle body 210 is substantially the same as an outer profile of the spout 205. This arrangement improves the aesthetics of the faucet 200 by providing a harmonious outer profile between the base 213 and the spout 205 with a more seamless appearance.

The shoulder 214 of the handle body 210 extends outwardly form the base 213 and is configured to support the handle 211 either directly or indirectly, such as through the second valve 242. As shown best in FIGS. 10 and 14, the shoulder 214 is hollow member having a substantially cylindrical shape to receive other elements/components of the faucet 200, such as the second valve 242. An outer profile of the shoulder 214 may be substantially the same as an outer profile of the handle 211. This arrangement improves the aesthetics of the faucet 200 by providing a harmonious outer profile between the shoulder 214 and the handle 211 with a more seamless appearance.

As shown in FIG. 6, the first axis (i.e., the radial axis RA) of the handle 211 extends horizontally through a center of the handle 211. For example, the handle 211 may be a substantially cylindrical member that extends outwardly from the handle body 210 (e.g., the shoulder 214) in the direction along the radial axis RA. Thus, the radial axis RA may be configured as a horizontal axis, such that handle 211 extends horizontally from the handle body 210. The handle 211 may be open at an inner end having a chamber 216 (e.g., cavity) that receives the second valve 242 (e.g., at least a portion thereof). An outer end of the handle 211 may be closed. As noted, the outer profile of the handle 211 may complement (e.g., be the same as or substantially the same as) the outer profile of the shoulder 214 of the handle body 210.

The spout 205 is a hollow member having a first end 251 (e.g., inlet end, entrance, etc.) fluidly connected to a second end 252 (e.g., outlet end, outlet, etc.) through a fluid passage 253. As shown in FIGS. 9 and 15, the spout 205 is a generally U-shaped or J-shaped tubular element. The second end 252 may be configured to receive an element, such as an aerator 255, sprayer or other device to influence the configuration (e.g., shape, pattern) of the water emitted from the second end 252 of the spout 205. The first end 251 is configured to be coupled to another element of the faucet 200, which is discussed below.

The valve assembly includes one or more valves. As shown best in FIGS. 9, 11 and 14, the valve assembly includes a first valve 241 and a second valve 242. The first and second valves 241, 242 may have any suitable configuration based on disclosure provided herein.

The first valve 241 is fluidly connected to the hot and cold water supplies through the first and second fluid conduits 93, 94 (see FIG. 14) and controls the outputted temperature of water based on the hot and cold water received. The first valve 241 is received in an element/component (e.g., housing) of the base 202, which is discussed below. The first valve 241 can be adjusted, such as through an adjustment gear 243 (FIGS. 9 and 11) to vary the temperature of water outputted from the first valve 241 through an output 244. Upon rotation of the adjustment gear 243 in a first direction (e.g., clockwise, counterclockwise), the temperature of the outputted water is increased, whereas rotation of the adjustment gear 243 in a second direction that is opposite to the first direction decreases the temperature of the outputted water. The adjustment gear 243 may be rotatable relative to a casing 245 of the first valve 241, and the casing 245 may be retained by the base 202 to prevent relative rotation of the casing 245 and base 202 (FIG. 12).

The second valve 242 is fluidly connected to the outputted water from the first valve 241 and controls the flow rate of the outputted water to the spout 205. The second valve 242 has a full open position, which corresponds to a maximum flow rate of water to the spout 205, and a full closed position, which corresponds to a zero flow rate (i.e., no water flows to the spout 105). The second valve 242 may include any number of intermediate positions between the full open and full closed positions corresponding to various flow rates between the maximum and zero flow rates. The full open, full closed, and any intermediate positions of the second valve 242 are archived by rotation of the handle 211 relative to the handle body 210 (as shown in FIG. 2). The handle 211 retains a first portion 272a of the second valve 242 such that rotation of the handle 211 drives rotation of the first portion 272a relative to a second portion 272b of the second valve 242, which is retained by the shoulder 214 (FIGS. 10 and 12). As shown, the first portion 272a includes splines that align with complementing splines in a cavity 216 of the handle 211 to drive rotation of the first portion 272a when the handle 211 is rotated.

Figure 16:
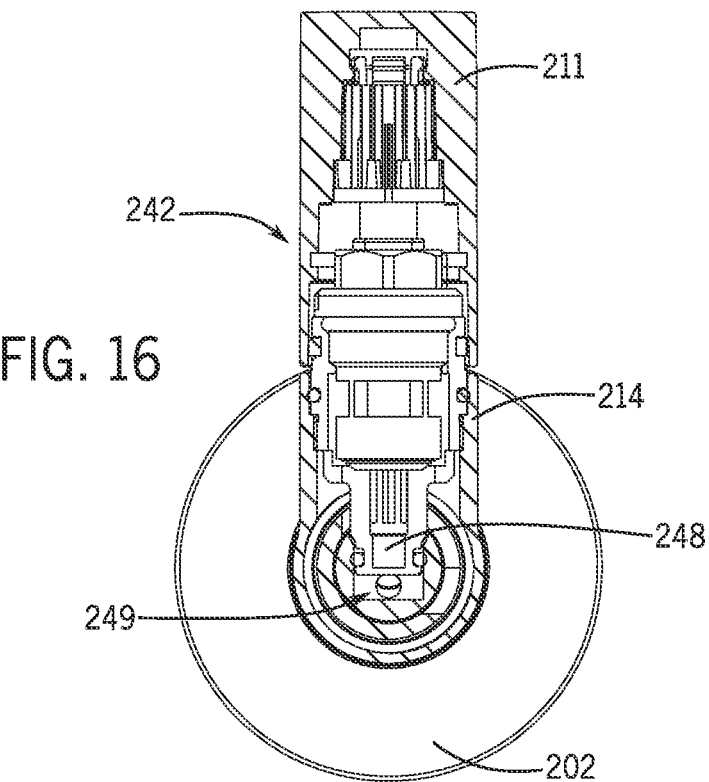
FIG. 16 is another cross-sectional view of the faucet shown in FIG. 6 taken along line 16-16 in FIG. 15.
Figure 17:
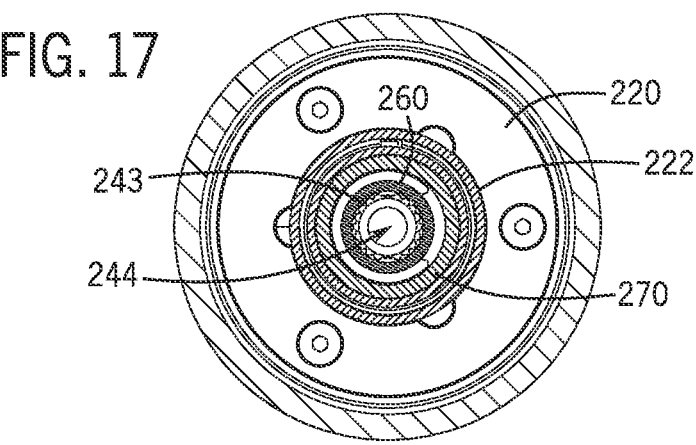
FIG. 17 is another cross-sectional view of the faucet shown in FIG. 6 taken along line 17-17 in FIG. 15.

The second valve 242 may include a valve member 248 that is configured to move (e.g., translate, rotate, etc.) between full open, full closed, and any intermediate positions relative to a valve chamber 249 upon rotation of the handle 211 (see FIG. 16). The movement of the valve member 248 may be tied to the first portion 272a and the movement thereof. For example, rotation of the handle 211 in a first direction moves the valve member 248 to close off the valve chamber 249 in the full closed position to prevent water from flowing to the spout 205, whereas rotation of the handle 211 is a second direction (that is opposite to the first direction) moves the valve member 148 to open the valve chamber 249 to increase the flow rate to the spout 205 (e.g., maximize the flow rate to the spout 205 in the full open position). The valve member 248 may be part of or driven by a third portion 272c of the second valve 242 (see FIG. 10). The third portion 272c may have an outer end that is driven to rotation by the first portion 272a and an inner end that passes through the second portion 272b. A lock ring 272d may be used to retain the second valve 242 together and/or to the shoulder 214. For example, the lock ring 272d may retain the second portion 272b to the shoulder 214. A fastener 272e may be used to secure the first and third portions 272a, 272c together and/or one of the portions to the handle 211.

The faucet 200 includes one or more sleeves. As shown best in FIGS. 10 and 14, the faucet 200 includes a sleeve 206 (e.g., a first sleeve, a rotatable sleeve, etc.) that is configured to control the first valve 241 upon rotation. The sleeve 206 is configured to rotate with the handle body 210 about the longitudinal axis LA to control the first valve 241 and the water temperature. The sleeve 206 includes a hollow tubular member 260 defining an internal fluid passage 261 that fluidly connects the first valve 241 and the second valve 242. The sleeve 206 may include a torque connection 262 to rotate a mating torque connection of the first valve 241 (e.g., the adjustment gear 243) upon rotation of the sleeve 206 to adjust a temperature of the water from the first valve 241 to the second valve 242. As shown, the torque connection 262 is disposed at a first end 263 (e.g., bottom end, lower end, etc.) of the sleeve 206. The torque connection 262 may include a gear, a spline, a key-way feature (i.e., a feature having a shape that is configured to transmit torque) such as a star shape, square shape, "D" shape, "double D" shape or other suitable shape, or any other suitable torque transmission feature. The sleeve 206 includes an outlet 266 that is fluidly connected to the spout 205. As shown, the outlet 266 is in a second end 264 (e.g., top end, upper end, etc.) of the sleeve 206. The sleeve 206 may include an inlet opening 265 that is configured to receive a portion of the second valve 242 to control the flow rate of the water to the spout 205 upon rotation of the handle 211 and at least a portion of the second valve 242 (e.g., the first portion 272a) about the radial axis RA relative to the sleeve 206. As shown, the inlet opening 265 extends transversely through the tubular member 260 of the sleeve 206 at a location that is between the first and second ends 263, 264. The size of the inlet opening 265 can be tailored to the size of the second valve 242.

Also shown best in FIGS. 10 and 14, the faucet 200 includes a sleeve 107 (e.g., a support sleeve, a second sleeve, etc.) that is coupled to the base 202. According to one example, the sleeve 107 is configured to remain stationary with the base 202 upon relative rotation of the sleeve 206 and the handle body 210. According to another example, the sleeve 107 is coupled to the base 202, such as to prohibit movement along the longitudinal axis LA while allowing rotation of the sleeve 207 (e.g., relative to the base 202 and/or the sleeve 206). The sleeve 207 is configured to support the spout 205, such that the handle body 210 and the spout 205 can rotate relative to one another. As shown in FIG. 10, the sleeve 207 includes a hollow tubular member 270 defining an internal passage 271 (FIG. 12) in which the sleeve 206 is disposed. The tubular member 270 of the sleeve 207 extends from a first end 273 (e.g., bottom end, lower end, etc.) to a second end 274 (e.g., top end, upper end, etc.). As shown best in FIGS. 14 and 15, the first end 273 is configured to be coupled to and supported by the base 202, which is discussed below; and the second end 274 is configured to support the spout 205. The sleeve 207 may include an aperture 275 that is located between the first and second ends 273, 274 and is configured to receive the portion of the second valve 242 that is received by the inlet opening 265 of the sleeve 206. As shown in FIG. 10, the aperture 275 is elongated (e.g., slotted) to allow the second valve 242 to rotate relative to the sleeve 207 (if configured to be stationary) upon relative rotation of the sleeve 206 and the second valve 242 coupled thereto. Thus, the configuration (e.g., size, shape, etc.) of the aperture 275 in the sleeve 207 may be configured to allow for rotation of the handle body 210, the sleeve 206, and the second valve 242 between the maximum cold temperature and the maximum hot temperature.

The faucet 200 may include a swivel joint that allows for the relative rotation between the spout 205 and the sleeve 207 and/or the handle body 210. As shown in FIG. 12, the swivel joint includes a swivel connector 281 that includes a lower end 282, which engages an upper end of the sleeve 207 and/or an upper end of the handle body 210, and an upper end 283, which engages a lower end (e.g., the first end 251) of the spout 205, such as to allow the spout 205 to rotate relative to the sleeve 207 and/or the sleeve 206 to reposition the outlet in the spout 205. The swivel connector 281 may be a generally cylindrical element having a bore (e.g., through the center) to allow fluid (e.g., water from the second valve 242) to pass into the fluid passage 253 of the spout 205. The first end 251 of the spout 205 may include an undercut section (e.g., a section having a thinner wall relative to the adjacent wall) that receives the upper end 283 of the swivel connector 281. The lower end 282 of the swivel connector 281 may be coupled (e.g., fixedly, rotatably) to the (stationary) sleeve 207 and/or the handle body 210. For example, the lower end 282 may be coupled to the second end 274 of the sleeve 207. Also, for example, the lower end 282 may be rotatably received in the handle body 210.

The swivel joint may include a collar 280 that is disposed between a portion of the handle body 210 and a portion of the swivel connector 281 to allow relative rotation between the swivel connector 281 and the handle body 210. The collar 280 may be a cylindrical bushing to facilitate the relative rotation. The lower end 282 of the swivel connector 281 may include a channel (e.g., a recess having a smaller diameter than the adjacent section(s)) that receives the collar 280. The configuration (e.g., depth, length, etc.) of the channel may be tailored to the configuration of the collar 280.

Figure 14A:
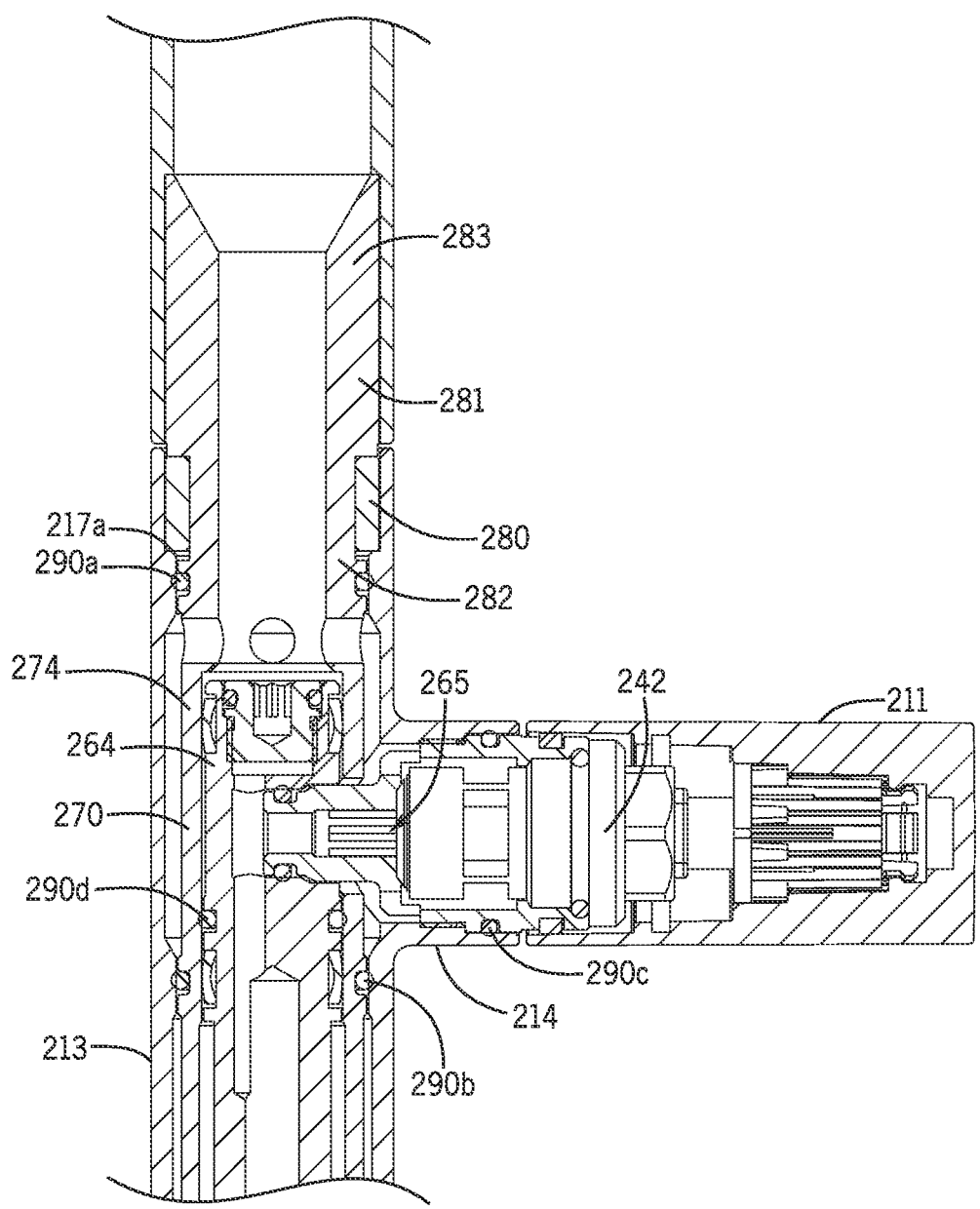
FIG. 14A is a detailed view of a portion of the faucet shown in FIG. 14.

A seal in the form an O-ring 290a may be disposed between the lower end 282 of the swivel connector 281 and the handle body 210 to prohibit leaking therebetween. One or both of the lower end 282 and the handle body 210 may include a channel or other feature for receiving the O-ring 290a. As shown in FIGS. 14 and 14A, the base 213 of the handle body 210 includes a first supporting section 217a that supports the collar 280 and the O-ring 290a. The first supporting section 217a has a smaller inner diameter relative to the adjacent section(s) of the base 213. A top of the first supporting section 217a may support a bottom of the collar 280 (if provided) and a top of the collar 280 may support the upper end 283 of the swivel connector 281.

The faucet 200 may include additional seals (e.g., O-rings) to help prohibit leaking. As shown best in FIGS. 14 and 15, an O-ring 290b may be disposed between the sleeve 207 and the base 213 of the handle body 210 just below the bottom of the shoulder 214; an O-ring 290c may be disposed between the shoulder 214 of the handle body 210 and the second valve 242; and an O-ring 290d may be disposed between the sleeve 206 and the sleeve 207 proximate to the second valve 242. The base 213 of the handle body 210 may include a second supporting section 217b that has a smaller inner diameter relative to the adjacent section(s) of the base 213, where the second supporting section 217b supports the O-ring 290b. As shown best in FIG. 10, an O-ring 290e may be configured to seal between the escutcheon 233 and the support bushing 232; and an O-ring 290f may be configured to seal between the retainer 222 and the second sleeve 207. Further, as shown best in FIG. 11, an O-ring 293 may be configured to seal between the escutcheon 233 and the housing 220.

Also shown best in FIGS. 14 and 15, the sleeve 106 is disposed within the sleeve 207, which is disposed within the handle body 210. Thus, the sleeve 207 is located between the sleeve 206 and the handle body 210. This arrangement advantageously facilitates actuation of the first valve 241 even when supported by or located proximate to the base 202, while supporting the spout 205.

As shown in FIGS. 9 and 13-15, the base 202 includes a housing 220, a collar 221, and a retainer 222. The housing 220 is a generally cylindrical element having extending between a bottom end 224 and a top end 225. The top end 225 is open defining a bore 226 that extends toward the bottom end 224. The bore 226 is configured to receive the first valve 241, which is retained by the housing 220 (e.g., a sidewall, the bottom end 224). The top end 225 includes an annular shoulder 227 that extends outward around the bore 226. The bottom end 224 includes one or more apertures (e.g., openings, bores) configured to receive fluid conduits for introducing the hot water and the cold water. As shown in FIG. 14, a first aperture 228a in the bottom end 224 is configured to receive a first fluid (e.g., hot water) conduit 93, and a second aperture 228b in the bottom end 224 is configured to receive a second fluid (e.g., cold water) conduit 94.

Figure 13:
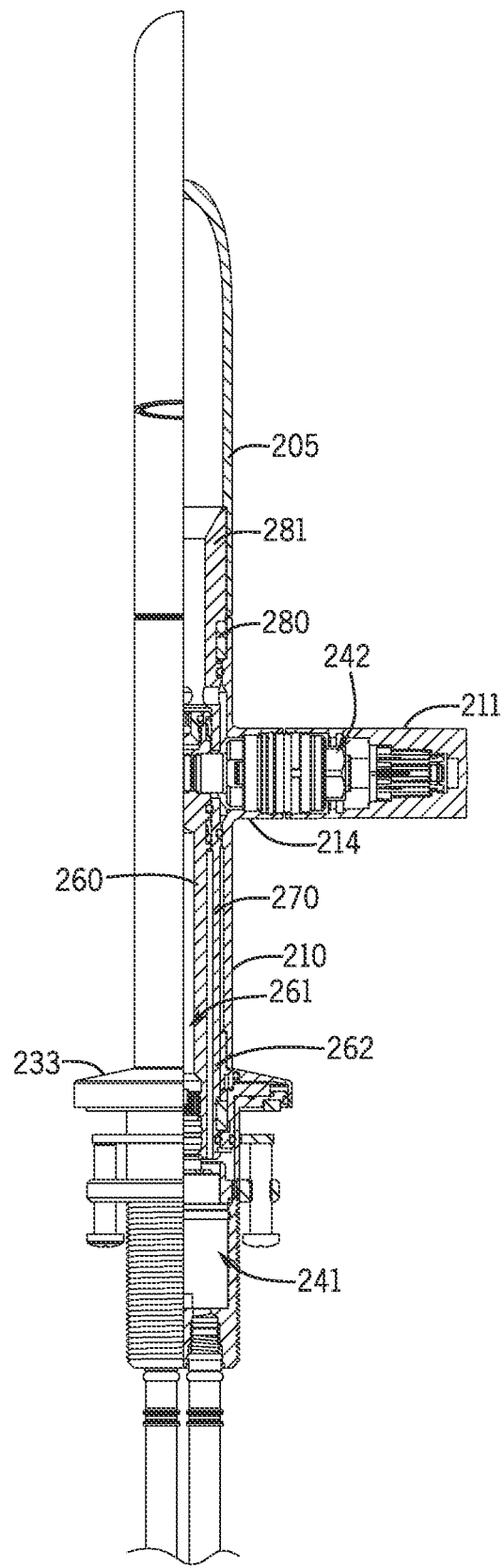
FIG. 13 is another cross-sectional view of the faucet shown in FIG. 6 taken along line 13-13 in FIG. 7.

The retainer 222 includes a sidewall 222a extending between a bottom end 222b and a top end 222c (see FIGS. 13-15). An annular flange 222d extends outwardly (e.g., radially) from the sidewall 222a at the top end 222c. The flange 222d includes one or more holes 222e, where each hole 222e receives a fastener 230 that secures the flange 222d to the shoulder 227 of the housing 220. Thus, the retainer 222 is coupled to the housing 220 through the fastener(s) 230. An inwardly extending flange 222f may be located at the bottom end 222b such that the inner diameter of the flange 222f is smaller than the adjacent section(s) of the retainer 222. The flange 222f may advantageously help retain the first valve 241 by prohibiting the first valve 241 to be withdrawn from the open end of the housing 220 (e.g., during assembly) and/or may help secure the sleeve 207 to the base 202.

Figure 14B:
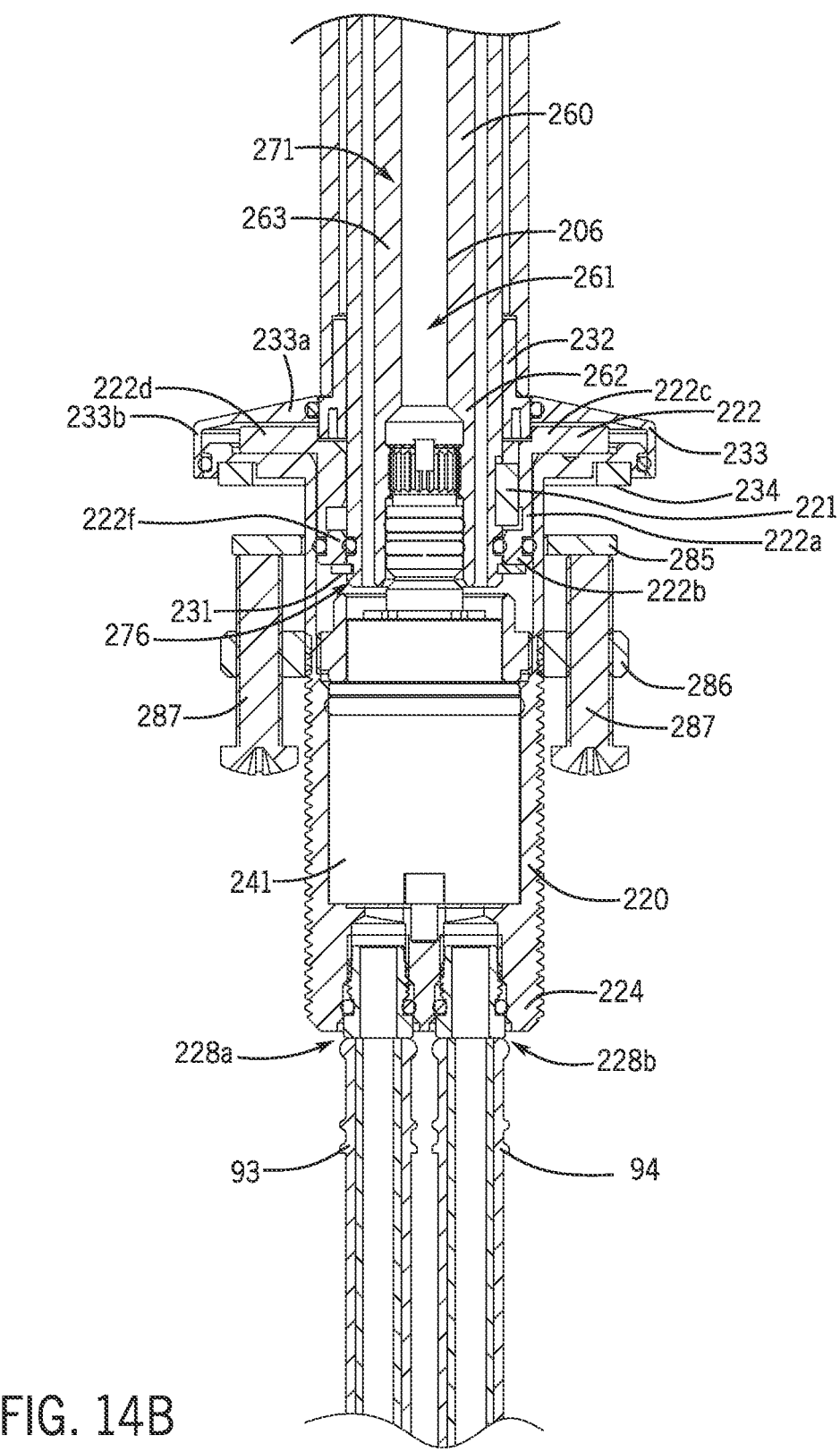
FIG. 14B is another detailed view of a portion of the faucet shown in FIG. 14.

As shown best in FIGS. 14 and 14B, a retaining member 231 is configured to secure the sleeve 207 to the retainer 222 by engaging a first groove 276 in the sleeve 207. The retaining member 231 may engage the end of the retainer 222 (e.g., the bottom end 222b) such as to prohibit the sleeve 207 and retaining member 231 from being withdrawn (e.g., moved upward) relative to the retainer 222. The retaining member 231 may engage a complementing groove in the retainer 222 (e.g., the flange 222f). The retaining member 231 may be a snap-ring having an annular shaped body with a notch (e.g., break) through the body to allow the member to flex into and out of engagement with the sleeve 207 and/or the retainer 222, may be a C-clip or may have any suitable configuration.

The collar 221 is may be a cylindrical member to support the second sleeve 207. The collar 221 may be a cylindrical bushing to facilitate relative rotation between the sleeve 207 and the retainer 222. The collar 221 may contact a portion of the outer surface of the sleeve 207 and/or a portion of the inner surface of the sidewall 222a of the retainer 222. The sleeve 207 and/or the retainer 222 may include a channel (e.g., a groove, a recess) having a smaller diameter than the adjacent section(s) that receives the collar 221.

The base 202 may include a support bushing 232 that supports and allows rotation of the handle body 210 relative to the base 202 (see FIG. 14). The support bushing 232 may include a base that is supported by the retainer 222. For example, the retainer 222 may include a counterbore that defines a shoulder on which the base of the support bushing 232 rests. A top part of the support bushing 232 may extend up from the base to define a shoulder on which the bottom of the base 213 of the handle body 210 rests. Thus, the handle body 210 may be rotatable about the support bushing 232. An inside of the support bushing 232 may engage (e.g., contact) or be adjacent to the sleeve 207.

The base 202 may include an escutcheon 233 that covers the base 202 to provide improved aesthetics of the faucet 200 when mounted (e.g., coupled, secured, etc.) to the support 90. The escutcheon 233 may include a top wall 233a and a sidewall 233b that define a cavity below the top wall 233a and inside the sidewall 233b (see FIG. 14). This cavity may house other elements/components of the base 202. For example, the flange 222d of the retainer 222 and top end 225 of the housing 220 are housed in the cavity, such that the top wall 233a and the sidewall 233b of the escutcheon 233 conceal the housed elements from view when the faucet 200 is installed to the support 90.

Figure 11:
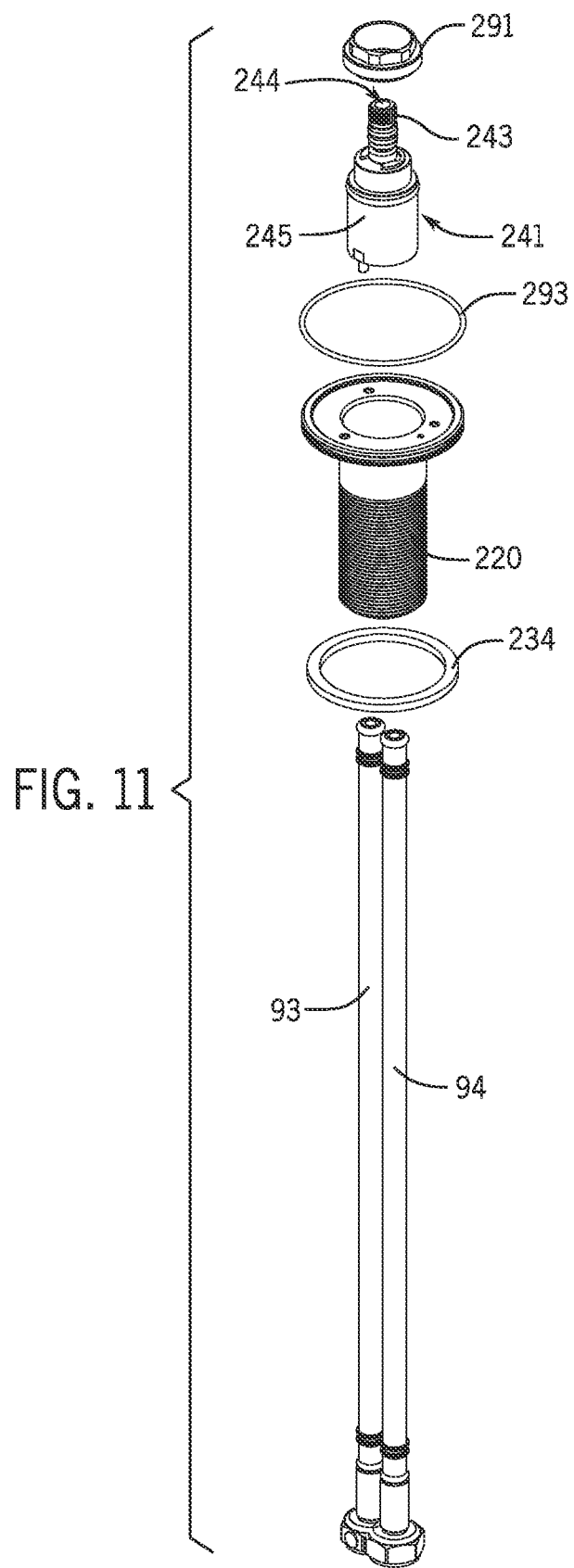
FIG. 11 is an exploded view of a portion of the faucet shown in FIG. 6.
Figure 12:
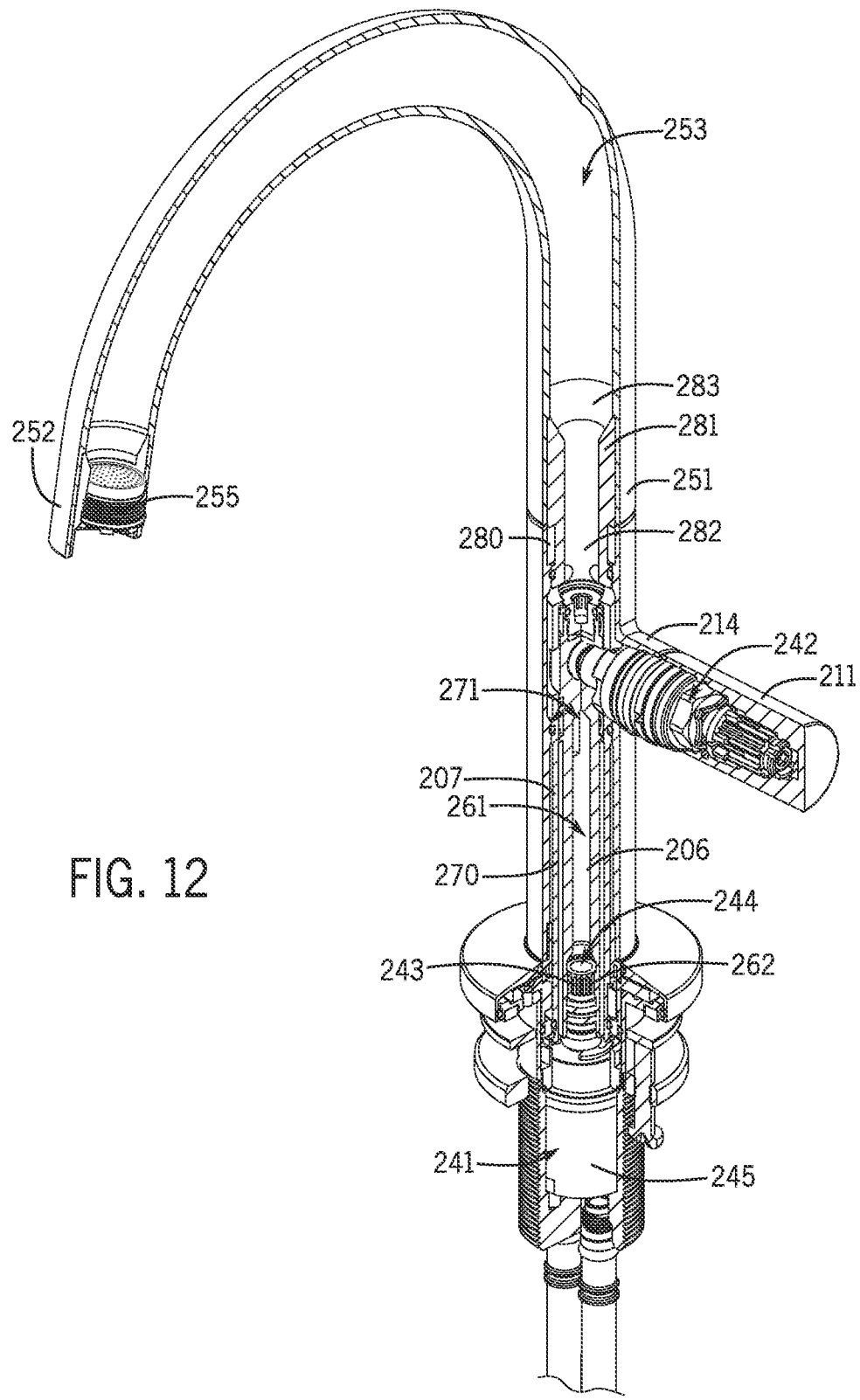
FIG. 12 is a cross-sectional view of the faucet shown in FIG. 6.

The base 202 may include a support 291, as shown in FIG. 11. The support 291 may engage the cavity of the housing 220 (which holds the first valve 241) to retain the first valve 241 in the cavity and/or support other elements/components of the faucet 200. For example, the support 291 may be configured to support one or more of the sleeves 106, 107. The support 291 may be configured to lock the position of the first valve 241, such as by retaining the casing 245 in place inside the housing 220. The first valve 241 can be placed in and indexed to the housing 220, then the support 291 may be screwed tight to another component of the system (e.g., the housing 220).

The base 202 may include a grommet 234 that is configured to rest on the mounting surface 91 of the support 90. The grommet 234 may be annular in shape and may be made out of an elastomeric material that is compressible to seal the connection between the support 90 and the grommet 234. During fastening of the base 202 to the support 90, the grommet 234 may be compressed. For example, the grommet 234 may engage a recess in an underside of the to end 225 of the housing 220.

The faucet 200 may include a fastening system 208 to secure the base 202 (e.g., one or more elements/components thereof) in place. For example, the fastening system 208 may secure the housing 220 in place to the support 90. As shown best in FIGS. 13 and 14, the fastening system 208 includes a clamp plate 285, a lock plate 286 and a fastener 287 to adjustably move the clamp plate 285 relative to the lock plate 286. For example, the fastening system 208 may include a plurality of fasteners 287, such as two fasteners 280 on opposite sides of system.

The clamp plate 285 is an annular plate having a top surface that is configured to contact a bottom surface of the member being clamped (e.g., the support 90). The clamp plate 285 also includes a bottom surface that is configured to be contacted by each fastener 287, such as an end thereof. The clamp plate 285 includes a central opening that is configured to receive the housing 220 to allow the clamp plate 285 to be slid over the housing 220 to contact the support 90.

The lock plate 286 is an annular plate having internal threads that thread to mating external threads of the housing 220 to allow the lock plate 286 to be screwed onto the housing 220 to secure the lock plate 286 in place relative to the housing 220. The threads may be provided on a portion of the housing 220 so that the lock plate 286 can be screwed down all the way (i.e., until reaching the non-threaded portion). In this way the non-threaded portion acts as a travel stop to the lock plate 286. The lock plate 286 includes a threaded opening in the annular portion for each fastener 287.

Each fastener 287 is threaded into one of the threaded openings of the lock plate 286 until contacting the clamp plate 285, then further rotation of the fastener 287 moves the clamp plate 285 away from the lock plate 286 through the movement of the end of the fastener 287. In this way, rotating each fastener 287 can move the clamp plate 285 toward the underside of the support 90 until the clamp plate 285 contacts the support 90, upon which further rotation (e.g., tightening) of the fastener 287 applies a clamping force into the support 90 by the clamp plate 285. The fastening system 208 advantageously allows for the faucet 200 to be secured to different thickness supports 90.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the faucets as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., spout, handle body, handle, sleeve(s), base, valve, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A faucet comprising:
   a handle body having a first portion extending along a longitudinal axis and a second portion extending along a radial axis, wherein the second portion comprises a hollow member;
   a first valve operatively coupled to the first portion and extending along the longitudinal axis such that rotation of the first portion about the longitudinal axis controls the first valve;
   a second valve disposed at least in part within the hollow member of the second portion, the second valve being operatively coupled to the second portion and extending along the radial axis such that rotation of the second portion about the radial axis rotates the second valve;
   a first elongated sleeve located within the handle body, the first elongated sleeve having an internal fluid passage that fluidly connects the first valve and the second valve, wherein the first elongated sleeve rotates with the handle body to control the first valve; and
   a second elongated sleeve disposed between the handle body and the first elongated sleeve, wherein the second elongated sleeve encompasses the exterior of the first elongated sleeve and is stationarily couplable to a base of the faucet, such that the second elongated sleeve includes an aperture located between a first and second, opposing ends of the second elongated sleeve configured to receive at least a portion of the second valve that is received by an inlet opening located between a third and fourth, opposing ends of the first elongated sleeve.

2. The faucet of claim 1, wherein a position of the second portion varies with a rotational position of the first portion.

3. The faucet of claim 1, wherein the first valve is disposed at least partially within the handle body.

4. The faucet of claim 1, wherein the first sleeve is concentric with the first valve.

5. The faucet of claim 1, further comprising:
   a spout extending from the handle body and having a fluid outlet; and
   the second sleeve supports the spout.

6. The faucet of claim 5, wherein the second sleeve encircles the first sleeve, and wherein the handle body encircles the second sleeve.

7. The faucet of claim 5, wherein the first sleeve includes an opening disposed at an intermediate position along the first sleeve, and the second sleeve includes an aperture that is alignable with the opening.

8. The faucet of claim 5, wherein the second valve extends through the second sleeve.

9. The faucet of claim 5, wherein the handle body and the first sleeve rotate about the longitudinal axis relative to the second sleeve.

10. The faucet of claim 1, wherein the hollow member comprises a shoulder, which extends along the radial axis, and wherein a portion of the second valve is disposed within the shoulder.

11. A faucet comprising:
    a handle body having a first portion rotatable about a longitudinal axis and a hollow second portion rotatable about a radial axis;
    a spout extending from an upper end of the handle body and having a fluid outlet;
    a first valve operatively coupled to the first portion; and
    a second valve operatively coupled to and disposed at least in part within the hollow second portion; and
    a first elongated sleeve located within and encircled by the handle body, wherein the first elongated sleeve has an internal fluid passage that fluidly connects the first valve and the second valve, wherein the first elongated sleeve rotates with the handle body to control the first valve; and
    a second elongated sleeve is disposed between the handle body and the first elongated sleeve, wherein the second elongated sleeve encompasses the exterior of the first elongated sleeve and is stationarily couplable to a base of the faucet, such that the second elongated sleeve includes an aperture located between a first and second, opposing ends of the second elongated sleeve configured to receive at least a portion of the second valve that is received by an inlet opening located between a third and fourth, opposing ends of the first elongated sleeve.

12. The faucet of claim 11, wherein a position of the second portion varies with a rotational position of the first portion.

13. The faucet of claim 11, further comprising the second sleeve supports the spout.

14. The faucet of claim 13, wherein the handle body and the first sleeve rotate relative to the second sleeve.

15. The faucet of claim 11, wherein the hollow member comprises a shoulder which extends along the radial axis, and wherein a portion of the second valve is disposed within the shoulder.

16. A faucet comprising:
    a handle body having a first portion that is rotatable about a first axis and a second portion that is rotatable about a second axis, the second axis oriented at an angle relative to the first axis, wherein the second portion comprises a hollow member;

a first valve operably coupled to the first portion such that rotation of the first portion about the first axis controls the first valve; and a second valve disposed at least in part within the hollow member, the second valve being operatively coupled to the second portion such that rotation of the second portion about the second axis controls the second valve; and a first elongated sleeve located within the handle body, the first elongated sleeve having an internal fluid passage that fluidly connects the first valve and the second valve, wherein the first elongated sleeve rotates with the handle body to control the first valve; and a second elongated sleeve disposed between the handle body and the first elongated sleeve, wherein the second elongated sleeve encompasses the exterior of the first elongated sleeve and is stationarily couplable to a base of the faucet, such that the second elongated sleeve includes an aperture located between a first and second, opposing ends of the second elongated sleeve configured to receive at least a portion of the second valve that is received by an inlet opening located between a third and fourth, opposing ends of the first elongated sleeve.

17. The faucet of claim 16, wherein the second axis is perpendicular to the first axis.

18. The faucet of claim 16, wherein a position of the second portion varies with a rotational position of the first portion.

* * * * *